US008850152B2

(12) United States Patent
Watanabe et al.

(10) Patent No.: US 8,850,152 B2
(45) Date of Patent: Sep. 30, 2014

(54) METHOD OF DATA MIGRATION AND INFORMATION STORAGE SYSTEM

(75) Inventors: Kentaro Watanabe, Yokohama (JP);
Takashi Tameshige, Tokyo (JP);
Masayasu Asano, Yokohama (JP);
Mutsumi Hosoya, Sagamihara (JP);
Hideo Saito, Kawasaki (JP)

(73) Assignee: Hitachi, Ltd., Toyko (JP)

( * ) Notice: Subject to any disclaimer, the term of this patent is extended or adjusted under 35 U.S.C. 154(b) by 252 days.

(21) Appl. No.: 13/512,616

(22) PCT Filed: May 17, 2012

(86) PCT No.: PCT/JP2012/003226
§ 371 (c)(1),
(2), (4) Date: May 30, 2012

(87) PCT Pub. No.: WO2013/171794
PCT Pub. Date: Nov. 21, 2013

(65) Prior Publication Data
US 2013/0311740 A1    Nov. 21, 2013

(51) Int. Cl.
*G06F 12/00* (2006.01)
(52) U.S. Cl.
USPC ............ 711/165; 711/114; 711/117; 711/162

(58) Field of Classification Search
CPC ..... G06F 3/0647; G06F 3/065; G06F 3/0683;
G06F 3/0665; G06F 11/1461; G06F 17/30578;
G06F 17/30581; G06F 3/0608; G06F 3/0685;
G06F 3/061; G06F 3/0614; G06F 3/0689;
G06F 12/08; G06F 17/30079; G06F 11/1458
See application file for complete search history.

(56) References Cited

U.S. PATENT DOCUMENTS 6,681,303 B1 *  1/2004  Watanabe et al. ............. 711/162
2011/0320754 A1   12/2011  Ichikawa et al.

* cited by examiner

*Primary Examiner* — Shawn X Gu
(74) *Attorney, Agent, or Firm* — Volpe and Koenig, P.C.

(57) ABSTRACT

An example of the invention is a method of data migration from a source volume including storage areas of a plurality of source storage tiers different in performance capability to a destination volume including storage areas of a plurality of destination storage tiers different in performance capability, data relocation being performed among the plurality of source storage tiers in accordance with accesses to the source volume during the data migration. The method includes: starting the data migration between volumes from the source volume to the destination volume; acquiring information on a data arrangement in the source volume determined based on an access history to the source volume during the data migration between volumes from the source volume to the destination volume; and determining a data arrangement in the destination volume during the data migration between volumes based on the data arrangement indicated by the acquired information.

13 Claims, 29 Drawing Sheets

Fig. 7

PAGE MANAGEMENT TABLE (412)

| LOGICAL VOLUME ID (701) | PAGE ID (702) | BLOCK ADDRESS (703) | CAPACITY (704) | ALLOCATION STATE (705) |
|---|---|---|---|---|
| 0x01 | 0001 | 0x0001~0x0010 | 100MB | ALLOCATED |
|  | 0002 | 0xE011~0xE020 | 100MB | UNALLOCATED |
|  | 0323 | 0xA051~0xA060 | 100MB | ALLOCATED |
| 0x38 | 0684 | 0xEF31~0xEF40 | 100MB | UNALLOCATED |
|  | 0386 | 0x1041~0x1050 | 100MB | UNALLOCATED |
|  | 0913 | 0x0651~0x0660 | 100MB | ALLOCATED |
| ⋮ | ⋮ | ⋮ | ⋮ | ⋮ |

Fig. 8

| VIRTUAL VOLUME MANAGEMENT TABLE 413 ||||
|---|---|---|---|
| VIRTUAL VOLUME ID 801 | PAGE ARRAY 802 | PAGE ID 803 | CAPACITY 804 |
| 001 | 1 | 0001 | 100MB |
|  | 2 | 0002 | 100MB |
|  | 3 | 0323 | 100MB |
|  | 4 | 0684 | 100MB |
| 002 | 1 | 0386 | 100MB |
|  | 2 | 0913 | 100MB |
| ⋮ | ⋮ | ⋮ | ⋮ |

Fig. 9

| TIER MANAGEMENT TABLE 414 ||
| 901 | 902 |
| STORAGE TIER | TYPE OF STORAGE AREA |
| 1 | FIRST-TYPE STORAGE DEVICE |
| 2 | SECOND-TYPE STORAGE DEVICE |
| 3 | THIRD-TYPE STORAGE DEVICE |

Fig. 10

PAGE-BASIS TIER MANAGEMENT MAPPING INFORMATION TABLE ~415

| VIRTUAL VOLUME ID ~1001 | PAGE ARRAY ~1002 | PAGE ID ~1003 | STORAGE TIER ~1004 | CAPACITY ~1005 |
|---|---|---|---|---|
| 001 | 1 | 0001 | 1 | 100MB |
| | 2 | 0002 | 2 | 100MB |
| | 3 | 0323 | 3 | 100MB |
| | 4 | 0684 | 2 | 100MB |
| ⋮ | ⋮ | ⋮ | ⋮ | ⋮ |

Fig. 11

I/O MONITORING MANAGEMENT TABLE (416)

| VIRTUAL VOLUME ID (1101) | MONITORING PERIOD (1102) | PAGE ID (1103) | I/O COUNT (1104) |
|---|---|---|---|
| 009 | 60min | 3401 | 55 |
| | | 5032 | 50 |
| | | 0323 | 24 |
| | | 0418 | 15 |
| ⋮ | ⋮ | ⋮ | ⋮ |

Fig. 13A

TIER CONFIGURATION MANAGEMENT TABLE (FOR SOURCE STORAGE) 1221A

| STORAGE TIER 1301 | TYPE OF STORAGE AREA 1302 | | MIGRATION SIZE 1303 |
|---|---|---|---|
| | TYPE OF STORAGE DEVICE 1304 | ROTATIONAL FREQUENCY 1305 | |
| 1 | SECOND-TYPE STORAGE DEVICE | 15000 | 100GB |
| 2 | THIRD-TYPE STORAGE DEVICE | 10000 | 100GB |
| 3 | FOURTH-TYPE STORAGE DEVICE | 7000 | 100GB |

Fig. 13B

TIER CONFIGURATION MANAGEMENT TABLE (FOR DESTINATION STORAGE) {1221B}

| STORAGE TIER (1311) | TYPE OF STORAGE AREA (1312) | | SIZE OF FREE SPACE (1313) |
|---|---|---|---|
| | TYPE OF STORAGE DEVICE (1314) | ROTATIONAL FREQUENCY (1315) | |
| 1 | FIRST-TYPE STORAGE DEVICE | 20000 | 100GB |
| 2 | SECOND-TYPE STORAGE DEVICE | 15000 | 100GB |
| 3 | THIRD-TYPE STORAGE DEVICE | 10000 | 500GB |
| 4 | FOURTH-TYPE STORAGE DEVICE | 7000 | 500GB |

Fig. 14

| STORAGE AREA MANAGEMENT TABLE ~1223 | | |
|---|---|---|
| ~1401 | ~1402 | ~1403 |
| STORAGE APPARATUS ID | VIRTUAL VOLUME ID | CAPACITY |
| 85001 | 001 | 300GB |
| | 002 | 500GB |
| | 003 | 600GB |
| | 004 | 100GB |
| 85002 | 101 | 500GB |
| | 102 | 500GB |
| ⋮ | ⋮ | ⋮ |

STORAGE-TO-STORAGE MIGRATION SCHEDULE MANAGEMENT TABLE

| SEQUENCE | PAGE ID | SOURCE STORAGE APPARATUS | DESTINATION STORAGE APPARATUS | DESTINATION STORAGE TIER | MIGRATION COMPLETED |
|---|---|---|---|---|---|
| 1 | 3401 | 85001 | 85003 | 1 | True |
| 2 | 5032 | 85002 | 85003 | 1 | True |
| 3 | 0323 | 85001 | 85003 | 2 | True |
| 4 | 0418 | 85001 | 85003 | 1 | False |
| 5 | 1138 | 85001 | 85003 | 2 | False |
| 6 | 0100 | 85002 | 85003 | 2 | False |
| 7 | 0016 | 85001 | 85003 | 2 | False |
| 8 | 0101 | 85002 | 85003 | 2 | False |
| 9 | 0301 | 85002 | 85003 | 3 | False |
| ⋮ | ⋮ | ⋮ | ⋮ | ⋮ | ⋮ |

TIER-TO-TIER MIGRATION SCHEDULE MANAGEMENT TABLE 1222

| SEQUENCE 1601 | PAGE ID 1602 | DESTINATION STORAGE APPARATUS 1603 | DESTINATION STORAGE TIER 1604 | MIGRATION COMPLETED 1605 |
|---|---|---|---|---|
| 1 | 3401 | 85003 | 1 | True |
| 2 | 5032 | 85003 | 1 | True |
| 3 | 0323 | 85003 | 1 | False |

Fig. 17

I/O STATISTICS INFORMATION TABLE (1224)

| TIME (1701) | PAGE ID (1702) | MONITORING PERIOD (1703) | I/O COUNT (1704) |
|---|---|---|---|
| 2012/3/31 10:00 | 9401 | 60min | 55 |
| 2012/3/31 11:00 | 9401 | 60min | 50 |
| 2012/3/31 12:00 | 9401 | 60min | 24 |
| 2012/3/31 13:00 | 9401 | 60min | 15 |
| 2012/3/31 14:00 | 9401 | 60min | 55 |
| 2012/3/31 10:00 | 9032 | 60min | 50 |
| 2012/3/31 11:00 | 9032 | 60min | 24 |
| 2012/3/31 12:00 | 9032 | 60min | 15 |
| 2012/3/31 13:00 | 9032 | 60min | 55 |
| ⋮ | ⋮ | ⋮ | ⋮ |

Fig. 23C

2500 PRESUMED TIER CONFIGURATION

| TIME (2501) | PAGE ID (2502) | STORAGE TIER (2503) |
|---|---|---|
| ESTIMATED CHANGEOVER TIME | 1000 | 3 |
| ESTIMATED CHANGEOVER TIME | 1001 | 1 |
| ESTIMATED CHANGEOVER TIME | 1002 | 2 |
| ESTIMATED CHANGEOVER TIME | 1003 | 3 |
| ESTIMATED CHANGEOVER TIME | 1004 | 1 |

METHOD OF DATA MIGRATION AND INFORMATION STORAGE SYSTEM

CROSS REFERENCE TO RELATED APPLICATION

This application claims priority to International Application No. PCT/JP2012/003226, filed May 17, 2012 which is incorporated by reference as if fully set forth.

TECHNICAL FIELD

This invention relates to a method of data migration and an information storage system and, in particular, relates to data migration between volumes having multiple storage tiers.

BACKGROUND ART

Storage virtualization is known as a technique to transfer data from a source storage apparatus to a destination storage apparatus without interruption of accesses from a host computer to data in the storage apparatuses and for the host computer to use the data successively after the migration.

In the meanwhile, for the storage system to provide the host with volumes, there is a known practice of forming a hierarchically tiered pool from multiple drives different in performance capability in the storage system to provision the host with virtual volumes configured from the pool.

The storage system analyzes input/output (I/O) loads from the host to the virtual volumes and automatically relocates pages with higher I/O load to higher-class tiers composed of resources of expensive disks having higher performance capability and pages with lower I/O load to lower-class tiers composed of resources of inexpensive disks having lower performance capability (data relocation among tiers). This technique effectively satisfies performance requirements at a lower total cost of ownership (TCO).

US 2011/0320754 A (PTL1) discloses an exemplary method of migration of volume data in a tier-managed storage apparatus. This literature discloses comparing the tier configuration of the source storage apparatus prior to the start of the migration with the tier configuration of the destination storage apparatus to transfer data from the source storage apparatus to the destination storage apparatus based on the result of the comparison.

CITATION LIST

Patent Literature

PTL 1: US 2011/0320754 A

SUMMARY OF INVENTION

Technical Problem

In storage operations, volume-to-volume online data migration may be required because of a business-related requisition. An application (host computer) accesses data in the source volume even during the volume-to-volume data migration. Consequently, the tier configuration (data arrangement in the storage tiers) of the source volume varies during the data migration.

If the tier configuration (page arrangement in tiers) of a volume used by the application after the migration is different from the one before the migration, performance in data access from the application might degrade at the time of changeover of access volume after the completion of data migration. Accordingly, desired is a technique to minimize degradation in data access performance at the changeover.

Solution to Problem

An aspect of this invention is a method of data migration from a source volume including storage areas of a plurality of source storage tiers different in performance capability to a destination volume including storage areas of a plurality of destination storage tiers different in performance capability, data relocation being performed among the plurality of source storage tiers in accordance with accesses to the source volume during the data migration. The method includes: starting the data migration between volumes from the source volume to the destination volume; acquiring information on a data arrangement in the source volume determined based on an access history to the source volume during the data migration between volumes from the source volume to the destination volume; and determining a data arrangement in the destination volume during the data migration between volumes based on the data arrangement indicated by the acquired information.

Advantageous Effects of Invention

An aspect of this invention achieves minimum degradation in host access performance at changeover of access volume after completion of volume-to-volume online data migration.

BRIEF DESCRIPTION OF DRAWINGS

FIG. 7 illustrates an exemplary configuration of a page management table Example 1.

FIG. 8 illustrates an exemplary configuration of a virtual volume management table in Example 1.

FIG. 9 illustrates an exemplary configuration of a tier management table in Example 1.

FIG. 10 illustrates an exemplary configuration of a page-basis tier mapping information table in Example 1.

FIG. 11 illustrates an exemplary configuration of an I/O monitoring management table in Example 1.

FIG. 13A illustrates an exemplary configuration of a tier configuration management table in Example 1.

FIG. 13B illustrates an exemplary configuration of a tier configuration management table in Example 1.

FIG. 14 illustrates an exemplary configuration of a storage area management table in Example 1.

FIG. 15 illustrates an exemplary configuration of a storage-to-storage migration schedule management table in Example 1.

FIG. 16 illustrates an exemplary configuration of a tier-to-tier migration schedule management table in Example 1.

FIG. 17 illustrates an exemplary configuration of an I/O statistics information table in Example 1.

FIG. 23C is a drawing to illustrate an exemplary method of presuming a tier configuration in Example 1.

DESCRIPTION OF EMBODIMENTS

Figure 1:
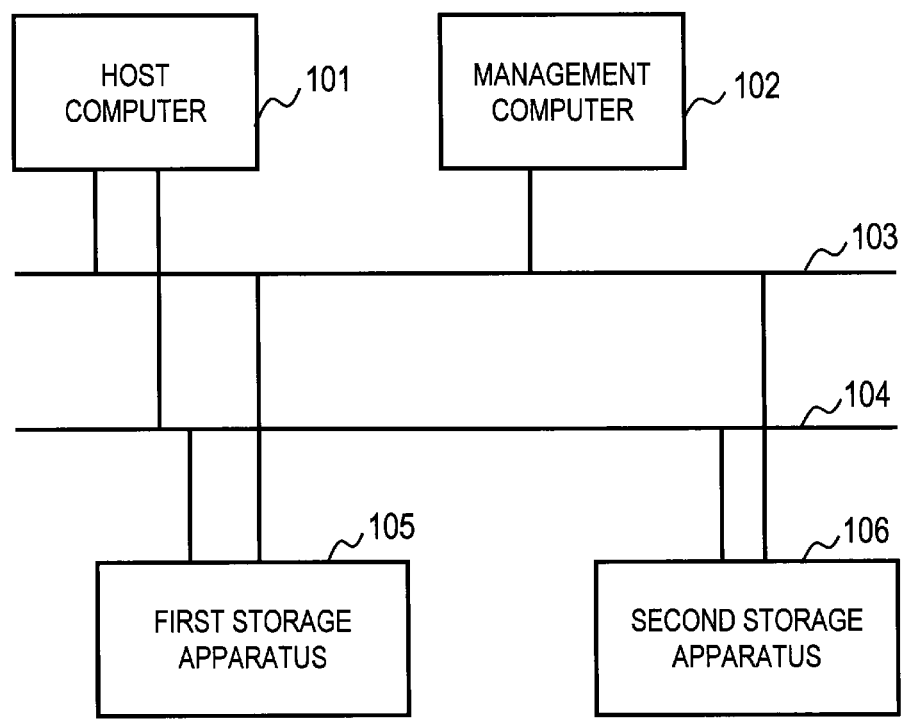
FIG. 1 is a block diagram schematically illustrating an overall configuration of an information storage system in Example 1.

Hereinafter, embodiments of this invention will be described with reference to the accompanying drawings. It should be noted that the embodiments are merely examples to realize this invention and are not to limit the technical scope of this invention. Throughout the drawings, elements common to some drawings are denoted by the same reference signs unless particularly explained.

As will be described later, the embodiments of this invention may be implemented by software operating on a general-purpose computer, dedicated hardware, or a combination of software and hardware.

In the following description, information utilized in the embodiments is explained mainly in the form of tables; however, information does not need to be expressed in the data structure of tables but may be expressed in the data structures of lists, DBs, queues, and other forms. Accordingly, tables, lists, DBs, or queues may be referred to as merely information in order to show independence from the data structure. In the meanwhile, terms such as identification information, identifier, name, and ID are used to explain the details of information; these terms may be replaced with one another.

The following explanations on processing in the embodiments of this invention will be provided with subjects (agents) of program; however, they may have the subjects of processor because a processor executes a program using memories and communication ports (communication control apparatuses) to perform predetermined processing.

The processing disclosed with subjects of program may also be regarded as processing performed by a computer such as a management computer or an information processing apparatus. A program, for all or a part of it, may be implemented by dedicated hardware or may be separated into modules. Programs can be installed in the computer or the information processing apparatus through a program distribution server or a non-transitory storage medium.

A processor operates in accordance with a program to work as an operation unit for implementing a predetermined function. For example, the processor operates in accordance with a control program to function as a control unit and operates in accordance with a management program to function as a management unit. An apparatus or a system including the processor is an apparatus or a system including these operation units.

The embodiments perform volume data migration in a configuration where the source volume and the destination volume are managed in tiers. An application running on a host computer issues inputs/outputs (I/Os) even in the course of the volume data migration; the access pattern of I/Os issued by the application varies during the data migration. Consequently, the tier configuration (data arrangement in the storage tiers) of the source volume varies during the data migration.

In particular, since the size of a volume ranges tens gigabytes to several terabytes and the total amount of data in a storage apparatus reaches several petabytes, migration will take several days. After such time-consuming migration, the tier configuration at the actual changeover is different from the tier configuration envisioned based on the I/Os before the migration, in most cases.

The embodiments monitor volume I/O information which dynamically varies after the start of migration and determine the destination storage tier in the destination volume based on the result of the monitoring. This method achieves a smaller difference in tier configuration between the source volume and the destination volume to minimize degradation in application access performance at the changeover.

EXAMPLE 1

Hereinafter, Example 1 will be described. To achieve a minimum difference in tier configuration between the source volume and the destination volume at switching accesses to the destination volume after the completion of migration, this example acquires information on I/O history of the source volume from the start of the migration to determine the destination storage tier of page data. This example dynamically determines the destination storage tier in migration of page data from the source volume to the destination volume based on the I/O history, and further, dynamically modifies the tier configuration (data arrangement in the storage tiers) in the destination volume.

FIG. 1 is a block diagram schematically illustrating an overall configuration of an information storage system in this embodiment. This information storage system includes a host computer (also referred to as host in the following description) 101, a management computer 102, a first storage apparatus 105, and a second storage apparatus 106. The numbers of host computers, management computers, storage apparatuses that can be included in the information storage system depend on the design.

The host computer 101, the management computer 102, and the storage apparatuses 105 and 106 are connected to be able to communicate with one another via a management network 103, which may be an IP network by way of example.

The management network 103 may also be a network other than the IP network as far as it is a network for data communication.

The host computer 101 and the storage apparatuses 105 and 106 are connected via a data network 104. The host computer 101 is a computer that accesses resources of the storage apparatuses 105 and 106 to work. The data network 104 is a network for data communication, which may be a storage area network (SAN) by way of example. The data network 104 may be a network other than the SAN as far as it is a network for data communication. The data network 104 and the management network 103 may be the same network.

Figure 2:
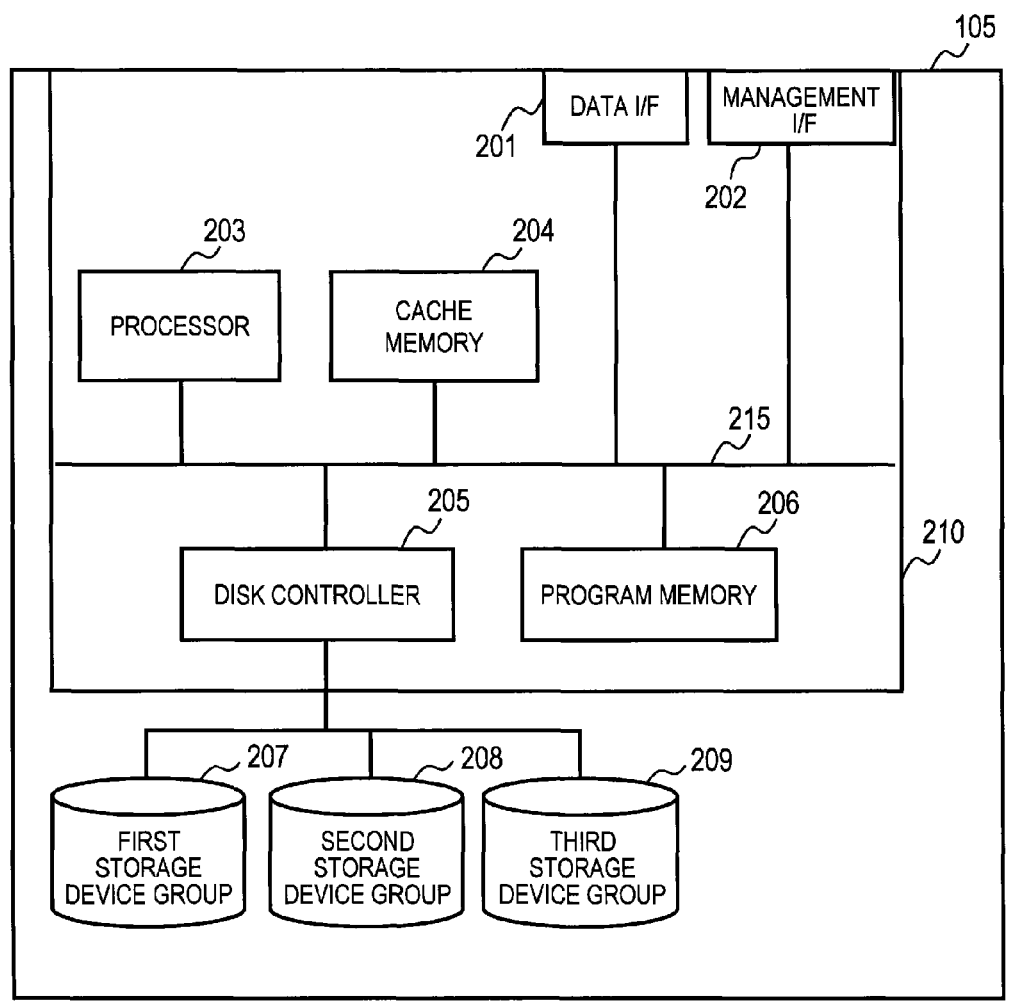
FIG. 2 illustrates an exemplary hardware configuration of a storage apparatus in Example 1.

The storage apparatuses 105 and 106 have the same configuration. Accordingly, the configuration of the storage apparatus 105 will be specifically described as follows. FIG. 2 illustrates an exemplary hardware configuration of the storage apparatus 105. The storage apparatus 105 includes a first storage device group 207, a second storage device group 208, a third storage device group 209, and a controller 210. For example, the first storage device group 207, the second storage device group 208, and the third storage device group 209 are composed of solid state drives (SSDs), serial attached SCSI (SAS) drives, and serial ATA (SATA) drives, respectively.

The controller 210 includes a processor 203, a program memory 206, a cache memory 204, a disk controller 205, a data interface 201, and a management interface 202. These are connected to be able to communicate with one another via an internal bus 215.

The processor 203 (controller 210) executes a storage control program and other necessary programs to implement predetermined functions including control of I/Os from the host computer 101 and management and control of pools and volumes in the storage apparatus 105. The program memory 206 stores programs executed by the processor 203 and data therefor.

The cache memory 204 temporarily stores data (user data) of the host computer 101. Specifically, it temporarily stores user data (write data) from the host computer 101 to transfer it to one of the storage device groups 207 to 209. It also temporarily stores user data (read data) to be transferred from one of the storage device groups 207 to 209 to the host computer 101.

The disk controller 205 has a function to convert a protocol used for communication between the storage drive groups 207 to 209 and the controller 210, such as FC, serial attached SCSI (SAS), or serial advanced technology attachment (SATA), into a protocol used inside the storage controller 210, such as PCIe.

The data interface 201 and the management interface 202 are connected to the data network 104 and the management network 103, respectively, and have functions to convert the respective protocols used for communication in the networks to a protocol used inside the controller 201.

Figure 3:
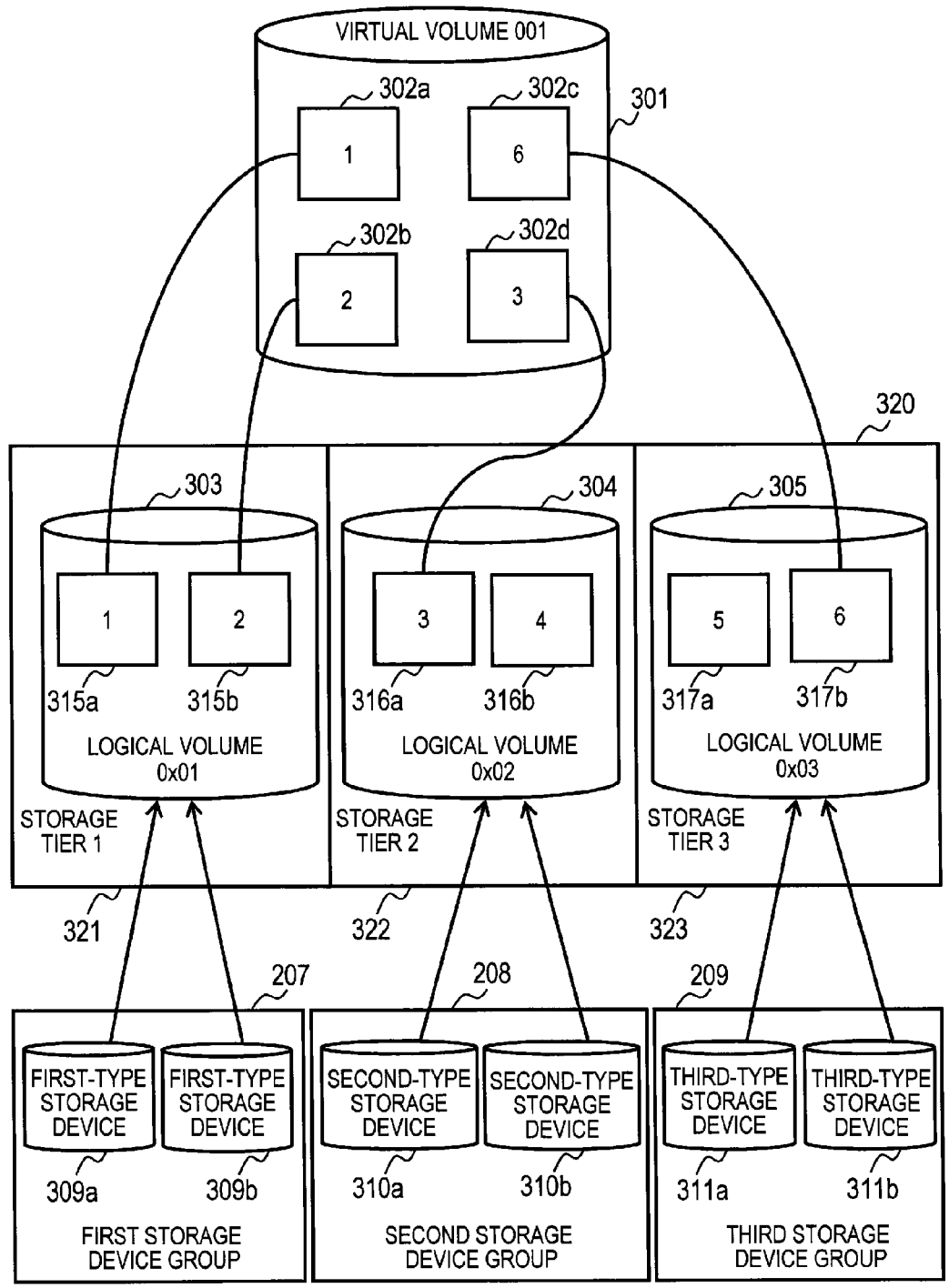
FIG. 3 schematically illustrates logical configuration of volumes the storage apparatus provides to a host computer and relationship among volumes and storage device groups in Example 1.

FIG. 3 schematically illustrates logical configuration of volumes the storage apparatus 105 provides to the host computer 101 and relationship among the volumes and the storage device groups 207 to 209. The storage apparatus 106 can provide similarly configured volumes to the host computer 101.

The controller 210 configures a pool 320 that consists of a plurality of unit storage areas (pages). In the example of FIG. 3, the pool 320 consists of a plurality of logical volumes (real volumes) and each logical volume consists of a plurality of pages. The controller 210 can configure a plurality of pools. The controller 210 configures a virtual volume 301 that is dynamically allocated storage areas (pages) in the pool 320.

The host computer 101 is provided with the virtual volume 301, recognizes the virtual volume 301, and accesses it.

The pool is hierarchically tiered into a plurality of storage tiers different in access performance capability. In this example, the pool 320 consists of three storage tiers 321 to 323. The storage tier 1 (321) has the highest access performance capability and the storage tier 3 (323) has the lowest. In this example, the storage tiers 321 to 323 include logical volumes 303 to 305, respectively, by way of example. The storage tiers 321 to 323 each include one or more logical volumes.

The storage drive groups 207 to 209 provide storage areas for the storage tiers 321 to 323, respectively. The first storage device group 207 is composed of a first type of storage devices; FIG. 3 shows two first-type storage devices 309a and 309b. The second storage device group 208 is composed of second type of storage devices; FIG. 3 shows two second-type storage devices 310a and 310b. The third storage device group 209 is composed of third type of storage devices; FIG. 3 shows two third-type storage devices 311a and 311b.

The three types of storage devices in the storage device groups 207 to 209 are different in access performance capability. In this example, the first type of storage devices have the highest performance capability and the third type of storage devices have the lowest performance capability. The access performance is expressed in indices such as response time and throughput. Typically, redundant arrays of inexpensive disks (RAID) composed of a plurality of storage devices provide a plurality of volumes (resources).

The controller 210 configures logical volumes (real volumes) different in access performance capability from storage areas provided by the storage device groups 207 to 208. As mentioned above, the logical volume 303 composed of storage areas of the storage device group 207 has the highest access performance capability and the logical volume 305 composed of storage areas of the storage device group 209 has the lowest access performance capability.

In the pool 320, each volume is composed of a plurality of pages. Pages are unit storage areas to manage virtual volumes and pools. In the example of FIG. 3, the logical volume 303 includes pages 315a and 315b. The logical volume 304 includes pages 316a and 316b. The logical volume 305 includes pages 317a and 317b.

A volume provided to the host computer 101 is a virtual volume and its capacity is virtualized. Every time the virtual volume 301 is written by the host computer 101 to become in need of a data storage area, the controller 210 allocates a page to the virtual volume 301. In the example of FIG. 3, the virtual volume 301 includes virtual pages 302a to 302d.

The virtual pages 302a to 302d have been allocated logical pages (real pages): the virtual page 302a has been allocated the logical page (real page) 315a in the logical volume 303 of the storage tier 1 (321); the virtual page 302b has been allocated the logical page 315b in the logical volume 303 of the storage tier 1 (321); the virtual page 302c has been allocated the logical page 317b in the logical volume 305 of the storage tier 3 (323); and the virtual page 302d has been allocated the logical page 316a in the logical volume 304 of the storage tier 2 (322).

The storage apparatus 105 can configure the capacity of the virtual volume 301 recognized by the host computer 101 larger than the real size (total size of all pages) allocated to the virtual volume 301 and can also configure the real size required for the capacity allocated to the host computer 101 smaller than the capacity (thin provisioning). The storage apparatus 105 may provision the host computer 101 with a volume which is composed of pages in the pool 320 and has a real size equal to the capacity recognized by the host computer 101.

In an example, upon occurrence of a write from the host computer 101 to the virtual volume 301, the controller 210 newly allocates a required size of page from the highest-class storage tier 1 (301) of the pool 320 to the virtual volume 301. The controller may determine the storage tier for the page to be written by a different method.

Figure 4:
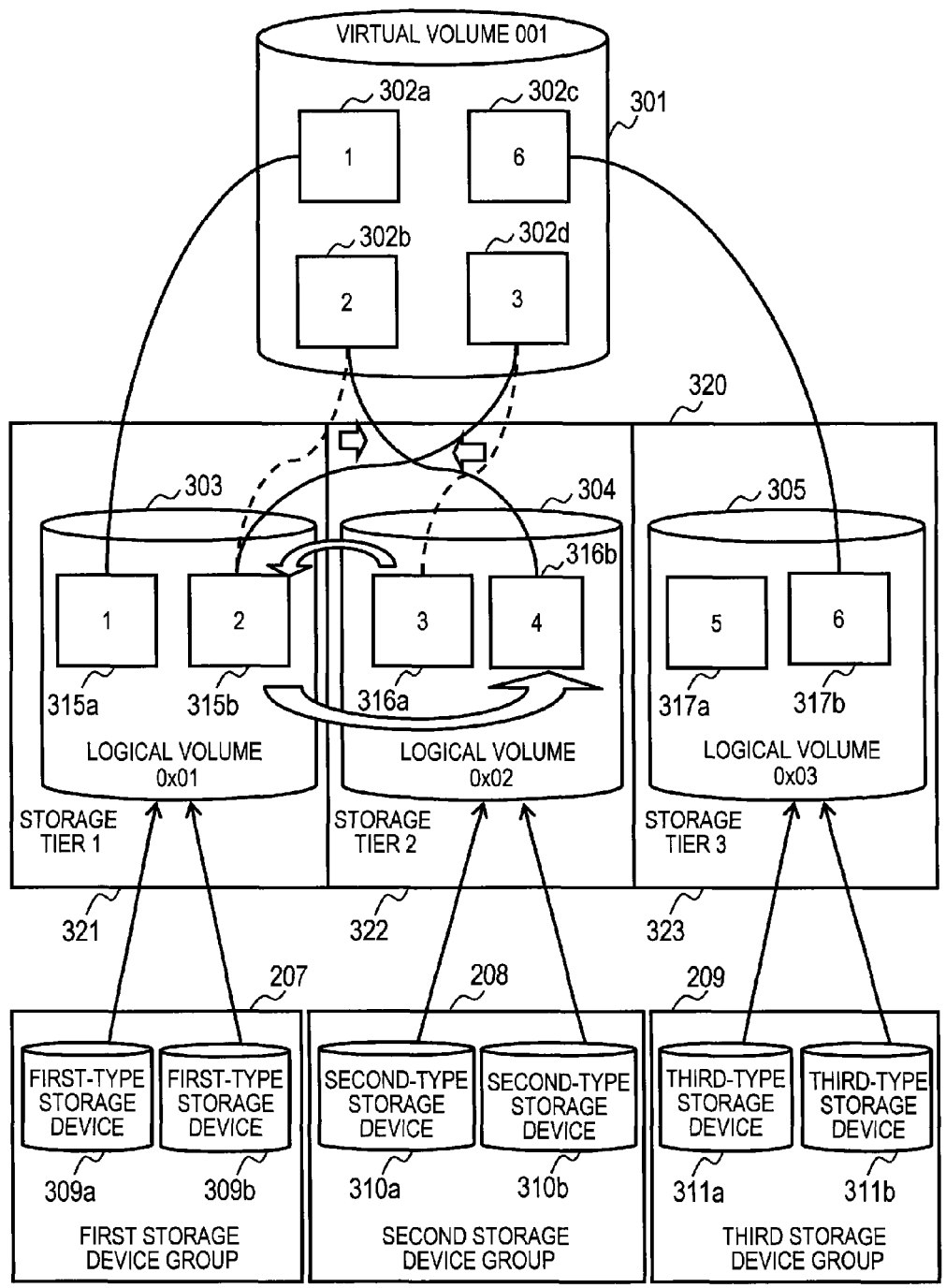
FIG. 4 illustrates exemplary relocation of page data between tiers in a pool in Example 1.

FIG. 4 illustrates exemplary relocation of page data between tiers in the pool 320. This example transfers data in the page 315b in the storage tier 1 (303) to the page 316b in the storage tier 2 (304) and transfers data in the page 316a in the storage tier 2 (304) to the page 315b in the storage tier 1 (303). As a consequence of the data relocation between tiers, the controller 210 switches the logical page allocated to the virtual page 302b from the page 315b to the page 316b and the logical page allocated to the virtual page 302d from the page 316a to the page 315b.

For example, the controller 210 monitors I/Os (the total number of read commands and write commands in this example) for every page in the tiered pool 320 in the storage apparatus 105 for a predetermined period (monitoring period) and stores the number of I/Os. Based on the number of I/Os (IOPS) of each page in the pool 320 in the monitoring period, the controller 210 relocates data in descending order of the IOPS so that the page with the highest IOPS will be placed in the highest-class tier (relocation among tiers). The relocation of page data is a known technique; explanation in this embodiment will be given as necessary.

The controller 210 determines whether to relocate page data in some page with reference to the IOPS of the page. For example, each tier is assigned a range of IOPS (host IOPS) and the controller 210 compares the IOPS of the page with the IOPS range for each tier to determine the tier to which the page data should belong.

If the IOPS of the page is not in the range of the current tier, the controller 210 determines to relocate the page data to the tier of which the range includes the IOPS. If the tier is used less than a specified amount, the controller 210 does not need to perform demotion (data migration to a lower-class storage tier).

In another example, the controller 210 determines the ranks of individual pages depending on the IOPS to determine the tiers the individual pages should belong to in accordance with the rank. In the case of a three-tier system, data in a specified number of high-rank pages is stored in the highest-class tier, data in a specified number of second-rank pages is stored in the middle-class tier, and data in the remaining pages is stored in the low-class tier.

Figure 5:
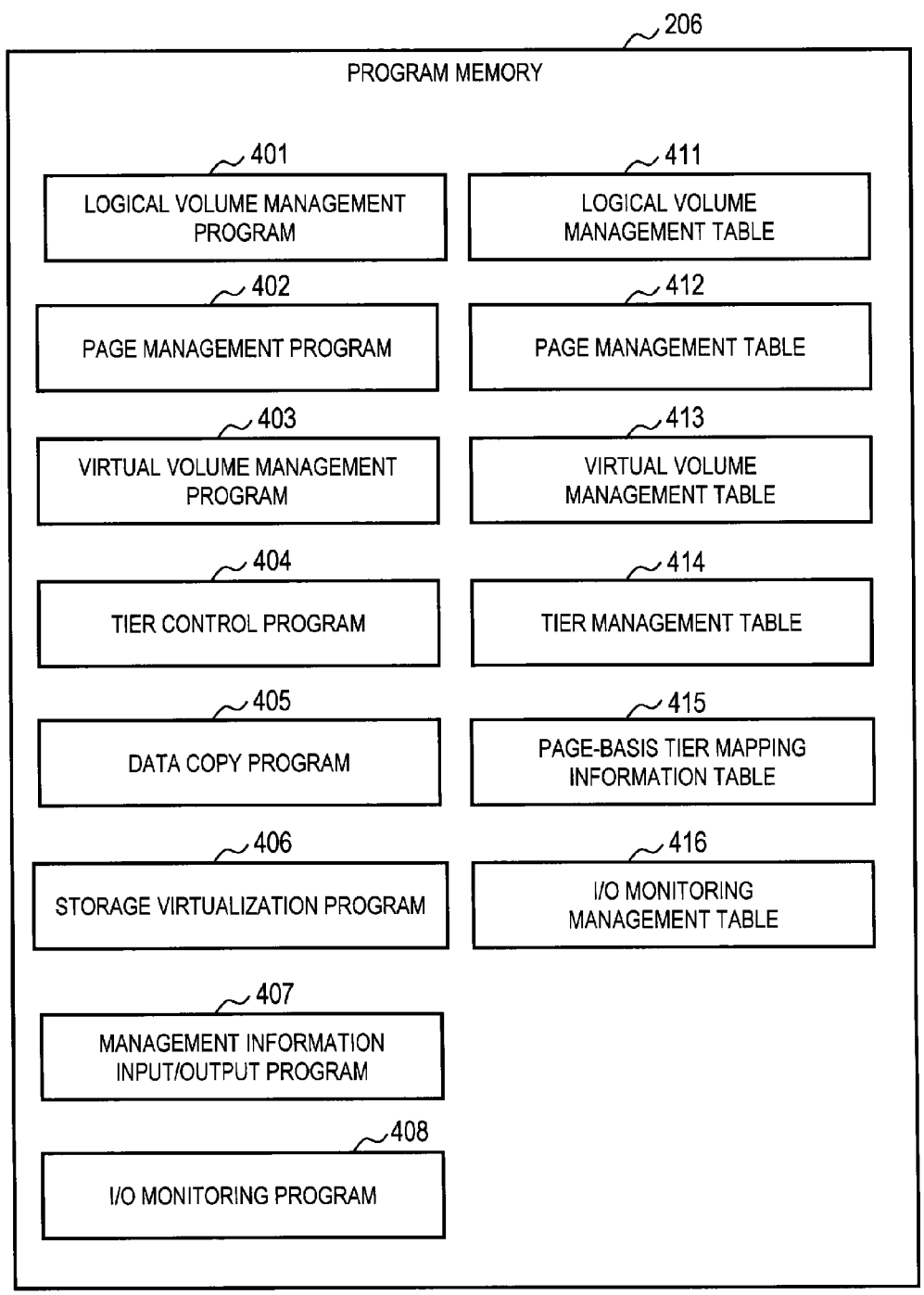
FIG. 5 illustrates an exemplary storage control program executed in a controller in Example 1.

FIG. 5 illustrates an exemplary storage control program executed in the controller 210. The storage control program includes a plurality of programs (modules) and information used thereby. In FIG. 5, programs and information used thereby are retained in the program memory 206.

In the example of FIG. 5, the program memory 206 retains a logical volume management program 401, a page management program 402, a virtual volume management program 403, a tier control program 404, a data copy program 405, a storage virtualization program 406, a management information input/output program 407, and an I/O monitoring program 408. The program memory 206 further retains a logical volume management table 411, a page management table 412, a virtual volume management table 413, a tier management table 414, a page-basis tier mapping information table 415, an I/O monitoring management table 416.

Figure 6:
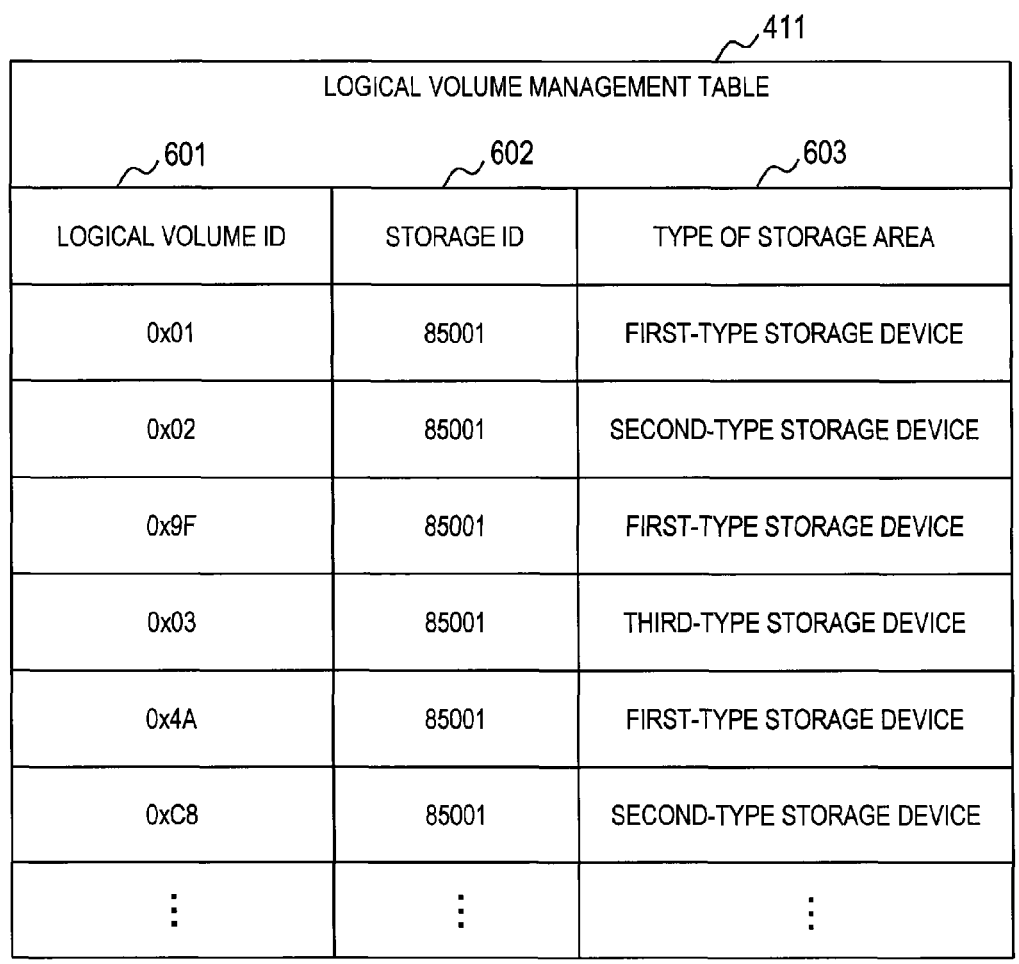
FIG. 6 illustrates an exemplary configuration of a logical volume management table in Example 1.

FIG. 6 illustrates an exemplary configuration of the logical volume management table 411. The logical volume management program 401 creates, deletes, and changes logical volumes, and records their information in the logical volume management table 411.

The logical volume management table 411 is to manage logical volumes in the storage apparatus 105 and external storage apparatuses directly connected thereto. It includes information on the storage apparatuses and the types of storage devices providing logical volumes. The logical volume management table 411 has columns of logical volume IDs 601, storage IDs 602, and types of storage area 603.

The logical volume ID column 601 holds IDs of logical volumes unique to the storage apparatus 105 and the external storage apparatuses directly connected thereto. The storage ID column 602 holds IDs of storage apparatuses storing logical volumes. The storage IDs are unique to the system managed by the management computer 102. The type of storage area column 603 stores types of storage devices including storage areas of the logical volumes. The types of storage devices indicate storage tiers of the pool.

FIG. 7 illustrates an exemplary configuration of the page management table 412. The page management table 412 manages information on pages in a pool. Specifically, it manages logical volumes individual pages belong to, the addresses of the pages in the storage devices, the capacities of the pages, and the allocation states to virtual volumes of the pages. The page management program 402 creates, deletes, and changes pages, and records their information in the page management table 412.

The page management table 412 includes columns of logical volume IDs 701, page IDs 702, block addresses 703, capacities 704, and allocation states 705. The logical volume ID column 701 holds IDs of logical volumes unique to the storage apparatus 105 and the external storage apparatuses directly connected thereto, like the logical volume ID column 601.

The page ID column 702 holds IDs of pages (logical pages) that belong to the individual logical volumes. The values of page IDs are unique to the storage apparatus 105 and the external storage apparatuses directly connected thereto. Each field of the block address column 703 indicates a storage device including the page and the address of the page in the storage device. The capacity column 704 stores the capacities of individual pages. In this example, the capacities of all the pages are the same. The allocation state column 705 stores information whether individual pages have been allocated to any virtual volume or not.

FIG. 8 illustrates an exemplary configuration of the virtual volume management table 413. The virtual volume management table 413 holds management information on virtual volumes provided by the storage apparatus 105. Specifically, the virtual volume management table 413 stores information on pages in a pool allocated to virtual volumes.

The virtual volume management table 413 includes columns of virtual volume IDs 801, page array 802, page IDs 803, and capacities 804. The virtual volume ID column 801 stores IDs to uniquely identify virtual volumes in the storage apparatus 105. The page array column 802 stores identifiers of virtual pages unique to the individual virtual volumes.

The page ID column 803 stores IDs of logical pages allocated to individual virtual pages. The IDs used in the page ID column 803 are the same as the IDs used in the page ID column 702. The capacity column 804 stores values of the capacities of the logical pages allocated to virtual pages. As mentioned above, the capacities of the logical pages are all the same in this example.

Another management table (not shown) relates the values of the page array to the addresses in the virtual volumes. In response to an access from the host computer 101, the controller 210 refers to the virtual volume management table 413 to identify the logical page corresponding to the specified address in a virtual volume and further refers to the page management table 412 to acquire the block address in the storage device storing data of the logical page.

The virtual volume management program 403 creates, deletes, and changes virtual volumes, and records their information in the virtual volume management table 413. When the tier control program 404 relocates data in a logical page allocated to a virtual page to a different logical page, it updates the value in the page ID column 803 in the entry of the virtual page with the ID of the destination logical page in the virtual volume management table 413.

FIG. 9 illustrates an exemplary configuration of the tier management table 414. The tier management table 414 holds information on tier configuration of individual pools in the storage apparatus 105. This example shows the tier configuration of one pool. The tier configuration management table 414 includes columns of storage tiers 901 and types of storage area 902. The storage tier column 901 stores identifiers of individual storage tiers in the pool. The type of storage area column 902 stores types of storage devices providing the individual storage tiers with storage areas.

FIG. 10 illustrates an exemplary configuration of the page-basis tier mapping information table 415. The page-basis tier mapping information table 415 manages storage tiers individual virtual pages belong to; it holds information on logical pages allocated to virtual pages and their storage tiers in this example. In the example of FIG. 10, the page-basis tier mapping information table 415 includes columns of virtual volume IDs, page array 1002, page IDs 1003, storage tiers 1004, and capacities 1005. The values held in these columns are the same as those in the same-labeled columns in the foregoing other drawings.

Upon creation, deletion, or change of a virtual volume, the virtual volume management program 403 records information on it to the page-basis tier mapping information table 415. Upon relocation of data in a logical page allocated to a virtual page to a different logical page, the tier control program 404 updates the value in the page ID column 1003 in the entry of the virtual page with the ID of the destination logical page in the page-basis tier mapping information table 415.

FIG. 11 illustrates an exemplary configuration of the I/O monitoring management table 416. The I/O monitoring management table 416 holds information on the number of I/Os for the pages being monitored. In this example, both of read accesses and write accesses are counted. The I/O monitoring management table 416 includes columns of virtual volume IDs 1101, monitoring periods 1102, page IDs 1103, and I/O counts 1104.

The monitoring period column 1102 stores values indicating the lengths of periods to count I/Os. In the example of FIG. 11, the value is 60 minutes. The I/O count column 1104 stores the number of I/Os for individual logical pages in the monitoring period. In this example, the I/O monitoring program 408 stores the number of I/Os in the monitoring period, i.e., 60 minutes, from the current time. The values in the other columns are the same as those in the foregoing tables.

The I/O monitoring program 408 counts accesses to individual logical pages during the monitoring period before the current time and periodically updates the value of the I/O count column 1104 in each entry. The monitoring period may be common to the virtual volumes or different depending on the virtual volume.

Figure 12:
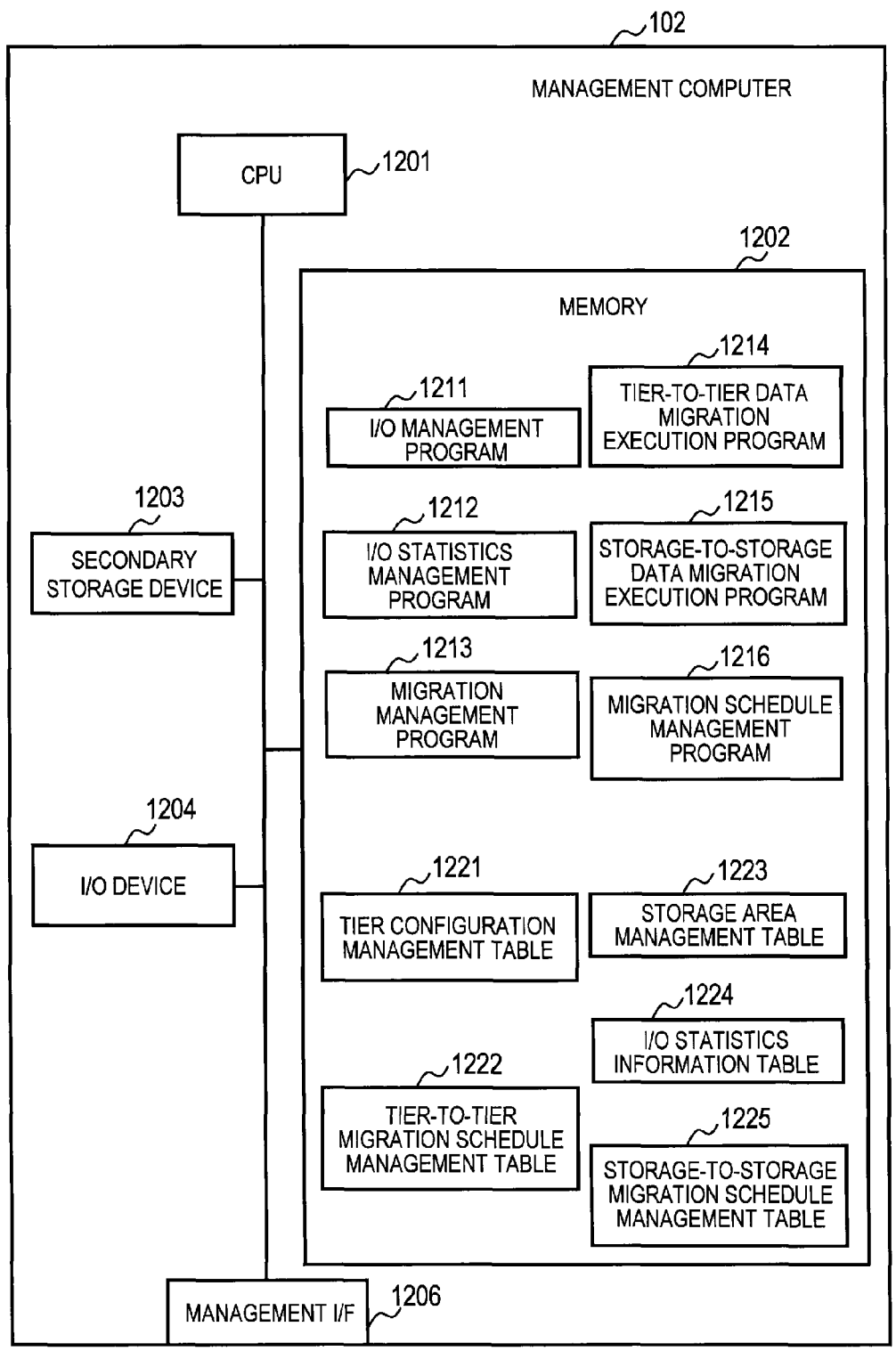
FIG. 12 illustrates an exemplary hardware configuration of a management computer in Example 1.

FIG. 12 illustrates an exemplary hardware configuration of the management computer 102. The management computer 102 includes a management interface 1206, a processor 1201, a memory 1202 of a primary storage device, a secondary storage device 1203, and an input/output device 1204. The management computer 102 executes a management program to work in accordance with it. The devices in the management computer 102 are connected to one another via a bus.

The input/output device 1204 includes one or more of devices such as a display, a pointer, a keyboard, and the like. The administrator can operate the management computer 102 with the input/output device 1204 or may access the management computer 102 from a client computer connected thereto via the network 103. The client computer is included in a management system together with the management computer 102.

The administrator inputs necessary information with the input/output device 1204 to check necessary information by sight. The management system may consist of one or more computers, which may each include a plurality of servers having a part or all of the functions of the management computer 102.

The processor 1201 executes programs retained in the memory 1202 to perform predetermined functions of the management computer 102. The memory 1202 stores programs to be executed by the processor 1202 and information required to execute the programs. The programs include a management program in addition to a not-shown OS.

As illustrated in FIG. 12, the management program includes a plurality of programs (modules) and information used by them. In this example, the management program includes an input/output management program 1211, an I/O statistics management program 1212, a migration management program 1213, a tier-to-tier data migration execution program 1214, a storage-to-storage data migration execution program 1215, and a migration schedule management program 1216.

The management program further includes a tier configuration management table 1221, a tier-to-tier migration schedule management table 1222, a storage area management table 1223, an I/O statistics information table 1224, and a storage-to-storage migration schedule management table 1225.

In typical, the management program is loaded from the secondary storage device 1203 to the memory 1202. The secondary storage device 1203 is a storage device including a non-volatile non-transitory storage medium for storing information (including programs and data) required to perform predetermined functions of the management computer 102. The secondary storage device 1203 may be an external storage device connected via a network.

The management computer 102 acquires necessary information from the administrator and the storage apparatuses 105 and 106 to create and update the above-mentioned tables. The input/output management program 1211 acquires information entered by the administrator and acquires information managed in the storage apparatuses from the management information input/output programs 407 in the storage apparatuses.

FIGS. 13A and 13B illustrate exemplary configuration of the tier configuration management table 1221. The tier configuration management table 1221 includes a tier configuration management table 1221A for the source illustrated by FIG. 13A and a tier configuration management table 1221B for the destination illustrated by FIG. 13B. The tier configuration management table 1221A for the source holds information on tier configuration in a source storage apparatus.

The tier configuration management table 1221B for the destination holds information on tier configuration in a destination storage apparatus. The tier configuration management tables 1221A and 1221B each hold tier configuration information on individual pools; this example shows tier configuration information on one pool by way of example.

The tier configuration management table 1221A includes columns of storage tiers 1301, types of storage area 1302, and migration sizes 1303. The storage tier column 1301 holds identifiers of individual tiers in the source pool. The type of storage area column 1302 holds information on the types of storage devices providing the storage tiers with storage areas and rotational frequencies in the individual types of storage devices. This example holds the rotational frequency as an index indicating performance of storage devices, but a different index such as response time may be held. The migration size column 1303 indicates the sizes of data in the individual storage tiers transferred to the destination storage apparatus.

The tier configuration management table 1221B includes columns of storage tiers 1311, types of storage area 1312, and sizes of free space 1313. The storage tier column 1311 holds identifiers of individual tiers in the destination pool. The type of storage area column 1312 holds information on the types of storage devices providing the storage tiers with storage areas and rotational frequencies in the individual types of storage devices. The tier configuration management table 1221B can also use a different index as the index indicating performance of the storage devices, which is the same as the tier configuration management table 1221A. The size of free space column 1313 indicates the sizes of free space that can store migration data in the individual storage tiers.

The migration management program 1213 manages the tier configuration management table 1221. Specifically, migration management program 1213 acquires information on the storage tiers and the types of storage areas from the administrator or the management information input/output programs 407 in the storage apparatuses through the input/output management program 1211.

The migration management program 1213 acquires information on migration sizes in individual source storage tiers and the sizes of free space in individual destination storage tiers from the management information input/output programs 407 in the source and destination storage apparatuses.

FIG. 14 illustrates an exemplary configuration of the storage area management table 1223. The storage area management table 1223 manages virtual capacities of virtual volumes in storage apparatuses under management. In this example, the storage area management table 1223 has columns of storage apparatus IDs 1401, virtual volume IDs 1402, and capacities 1403. The capacity column 1403 stores information on virtual capacities (capacities recognized by the host computer 101) of virtual volumes.

FIG. 15 illustrates an exemplary configuration of the storage-to-storage migration schedule management table 1225. The storage-to-storage migration schedule management table 1225 manages a schedule of data migration between storage apparatuses. This example manages the schedule of data migration between storage apparatuses in units of pages.

The storage-to-storage migration schedule management table 1225 includes columns of a sequence 1501, page IDs 1502, source storage apparatuses 1503, destination storage apparatuses 1504, destination storage tiers 1505, and migration completed 1506.

The sequence column 1501 stores information on a sequence of pages to migrate. Data in the page with the smallest value in the sequence is transferred first. The page ID column 1502 stores IDs of individual pages to migrate. The source storage apparatus column 1503 and the destination storage apparatus 1504 store IDs of source storage apparatuses and destination storage apparatuses, respectively, of pages to migrate.

The destination storage tier column 1505 stores IDs of destination storage tiers of the individual pages. The migration completed column 1506 stores values indicating whether the individual pages have already migrated or not. A field of a page that has already migrated to the destination storage apparatus stores "True" and a field of a page that has not migrated to the destination storage apparatus stores "False".

FIG. 16 illustrates an exemplary configuration of the tier-to-tier migration schedule management table 1222. The tier-to-tier migration schedule management table 1222 manages a schedule of data migration between tiers in a destination storage apparatus. This example manages the schedule of data migration between tiers in units of pages.

The tier-to-tier migration schedule management table 1222 includes columns of a sequence 1601, page IDs 1602, destination storage apparatuses 1603, destination storage tiers 1604, and migration completed 1605. The sequence column 1601 stores information on a sequence of pages to migrate; data in the page assigned the smaller value is transferred first. The values of page IDs are common to source storage apparatuses and destination storage apparatuses.

The destination storage apparatus column 1603 and the destination storage tier column 1604 store IDs of destination storage apparatuses and IDs of destination storage tiers, respectively. During data migration between storage apparatuses, the destination storage apparatus does not change. In contrast, the destination storage tier of page data may change during the data migration between storage apparatuses. Details will be described later.

The migration completed column 1603 stores information indicating whether pages that have migrated to destination storage apparatuses have migrated to destination tiers or not. The field of a page that has migrated to the destination storage tier stores "True" and the field of a page that has not migrated to the destination storage tier stores "False".

FIG. 17 illustrates an exemplary configuration of the I/O statistics information table 1224. The I/O statistics management program 1212 periodically acquires information from the management information input/output programs 407 in the storage apparatuses via the input/output management program 1211. Each management information input/output program 407 sends information held in the I/O monitoring management table 416 to the management computer 102.

The I/O statistics information table 1224 holds I/O statistics information on pages in the storage apparatuses under management. In this example, the I/O statistics information table 1224 has columns of times 1701, page IDs 1702, monitoring periods 1703, and I/O counts 1704. Each entry stores the number of I/Os (the I/O count column 1704) in the monitoring period (the monitoring period column 1703) immediately before a particular time (the time column 1701) for a particular page (the page ID column 1702).

The time column 1701 stores the end time of a monitoring period for each entry. The monitoring period column 1703 stores information on the lengths of the monitoring periods. The I/O count column 1704 stores values of the number of I/Os of pages. From the value of a monitoring period and the value of an I/O count, IOPS of a page can be calculated.

Figure 18:
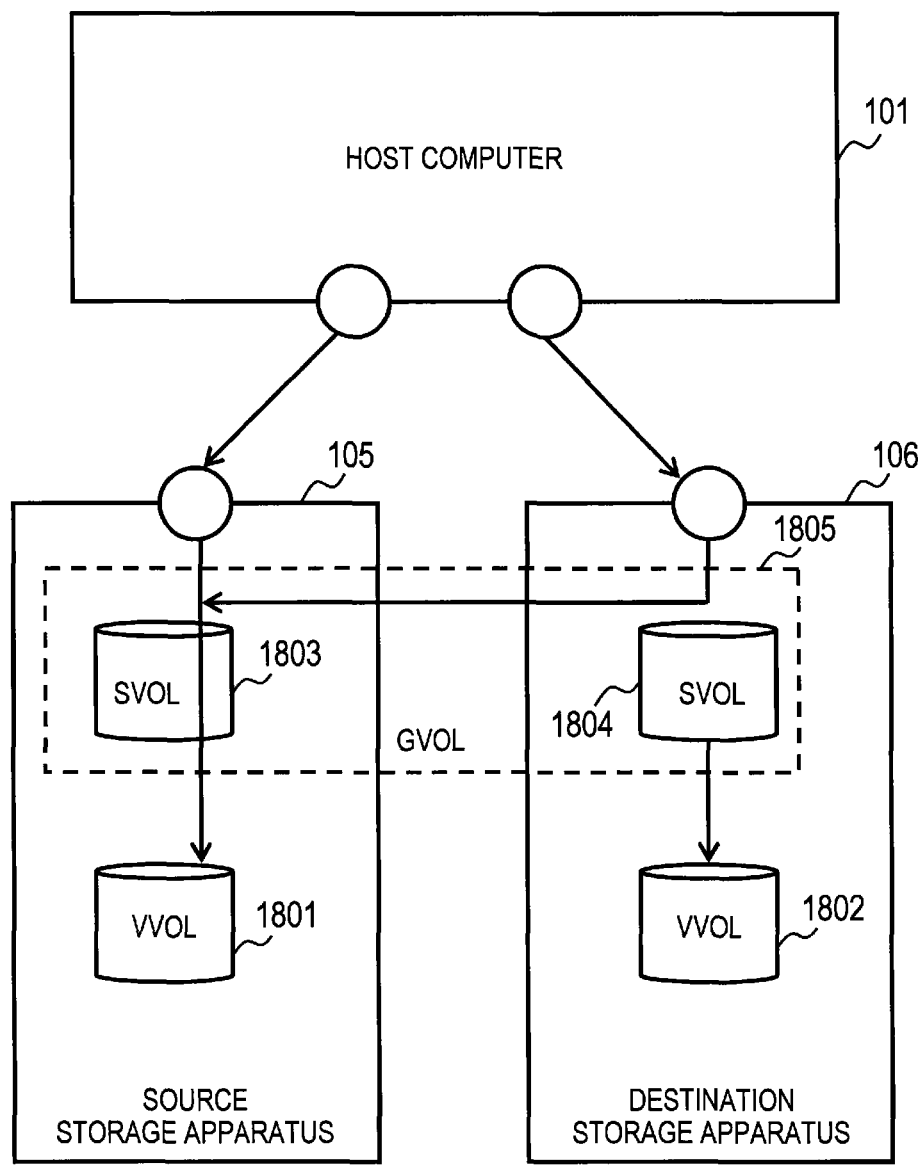
FIG. 18 is a drawing illustrating data migration between storage apparatuses in Example 1.

FIG. 18 is a diagram to illustrate data migration between storage apparatuses in this example. Data in the virtual volume 1801 in the storage apparatus 105 is transferred to the virtual volume 1802 in the storage apparatus 106. Data migration between the storage apparatuses 105 and 106 is carried out by the data copy programs 405 in the storage apparatuses 105 and 106. In this example, the host computer 101 can access the particular data during the storage-to-storage data migration. Such on-line data migration is a known technique; this description provides explanation as necessary.

During data migration between the storage apparatuses 105 and 106, switch volumes 1803 and 1804 are defined for the virtual volumes 1801 and 1802, respectively. Furthermore, a global volume 1805 is defined for the switch volumes 1803 and 1804.

Upon receipt of an instruction for data migration from the management computer 102, the storage virtualization programs 406 in the storage apparatuses 105 and 106 configure the switch volumes 1803 and 1804 for the designated virtual volumes 1801 and 1802, respectively, and further define the global volume 1805. During the data migration, the host computer 101 accesses the global volume 1805 to access the virtual volume 1801 in accordance with an instruction from the management computer 102.

A path management program (not shown) in the host computer 101 sends accesses from the host computer 101 to the global volume 1805 to either the storage apparatus 105 or 106 with reference to the network traffic. The storage virtualization program 406 in the source storage apparatus 105 that has received such an access command identifies the switch volume 1803 in the global volume 1805 and converts the access command to an access to the virtual volume 1801 allocated the switch volume 1803.

The storage virtualization program 406 in the destination storage apparatus 106 that has received such an access command identifies the switch volume 1804 of the global volume 1805 and the source storage apparatus 105 of the switch volume 1803 that forms a pair with the switch volume 1804 and transfers the access command to the source storage apparatus 105.

The storage virtualization program 406 in the source storage apparatus 105 converts the transferred access command to the access to the virtual volume 1801. Write data or read data of the access command is transferred between the storage apparatuses 105 and 106. In the case of a read, the source storage apparatus 105 may return the read data directly to the host computer 101.

The above-described on-line data migration method is an example; the system may perform data migration by a different method. For example, the global volume or the switch volumes do not need to be configured if they are not necessary for the data migration. Data migration may utilize the data network 104 or a local connection between storage apparatuses different from the data network 104.

Hereinafter, data migration between the storage apparatuses 105 and 106 shown in FIG. 18 will be specifically described. The following description is about a case where data is transferred from a source storage apparatus 105 to a destination storage apparatus 106.

Figure 19:
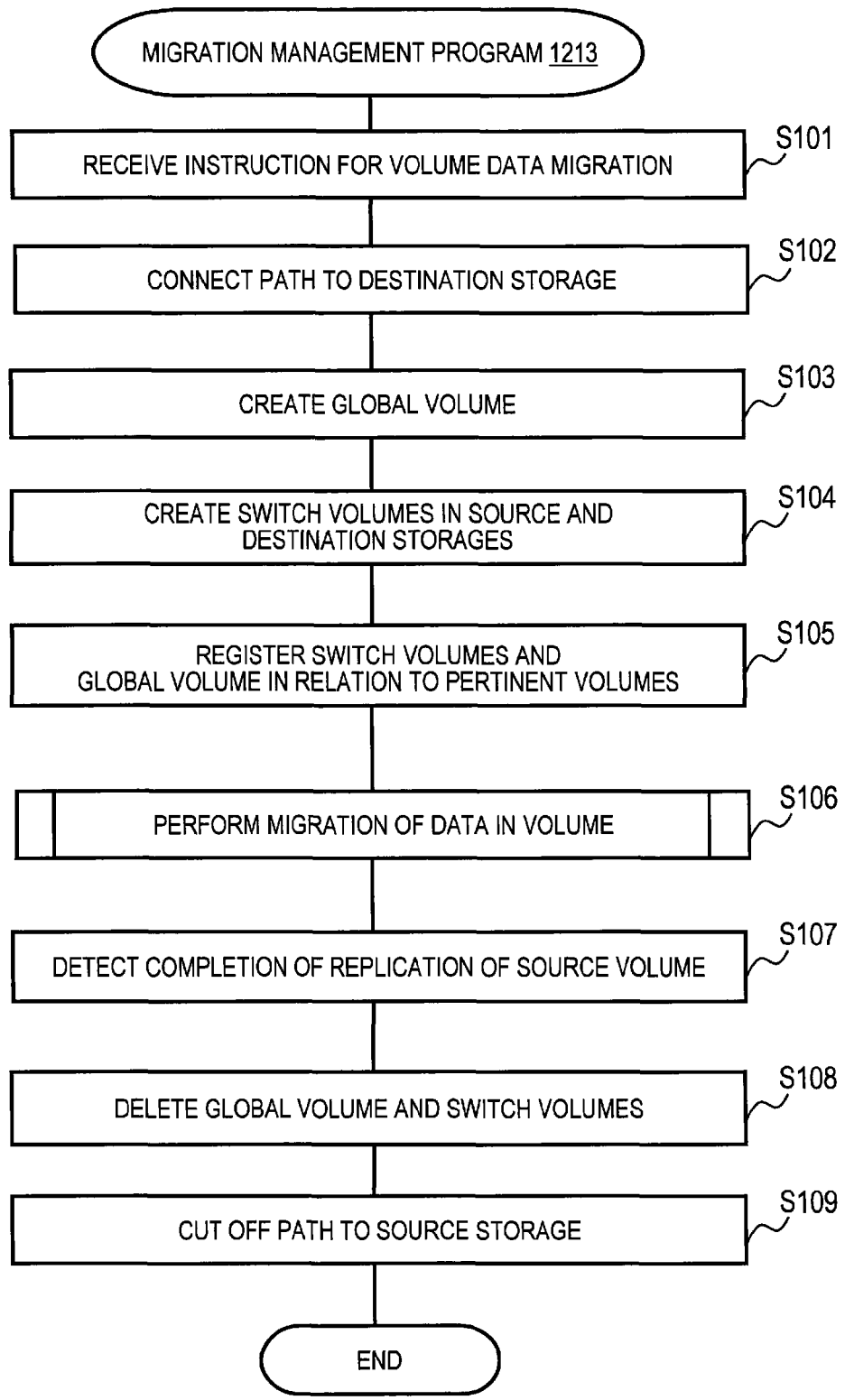
FIG. 19 illustrates exemplary processing of a migration management program in the management computer in Example 1.

FIG. 19 is an exemplary flow of processing of the migration management program 1213 in the management computer 102. The migration management program 1213 receives an instruction of the administrator for volume data migration from the input/output management program 1211 (S101). In this example, the migration data is identified with a virtual volume ID. The administrator can specify one or more virtual volumes. The following description explains migration of data in one virtual volume.

The migration management program 1213 connects a path between the host computer 101 and the destination storage apparatus 106 (S102). Specifically, the migration management program 1213 enables the destination storage apparatus 106 to permit accesses from the host computer 101.

Next, the migration management program 1213 creates a global volume 1805 (S103). The migration management program 1213 adds a new entry for the global volume to the management information for data migration and instructs the storage apparatuses 105 and 106 to create the global volume 1805. The storage virtualization programs 406 in the storage apparatuses 105 and 106 create the global volume 1805 (management information thereon) in accordance with the instruction.

Moreover, the migration management program 1213 creates switch volumes 1803 and 1804 (S104). The migration management program 1213 writes information on the two switch volumes 1803 and 1804 in relation to the newly created global volume in the management information for data migration.

The migration management program 1213 instructs the storage apparatuses 105 and 106 to create switch volumes 1803 and 1804 for the previously created global volume 1805. The storage virtualization programs 406 in the storage apparatuses 105 and 106 create switch volumes 1803 and 1804 (management information thereon) for the global volume 1805 in accordance with the instruction.

Next, the migration management program 1213 relates the pertinent virtual volumes 1801 and 1802 to the created switch volumes 1803 and 1804 and the global volume 1805 (S105). The migration management program 1213 writes information on the virtual volumes 1801 and 1802 in relation to the global volume 1805 and the switch volumes 1803 and 1804 in the management information for data migration.

The migration management program 1213 instructs the storage apparatuses 105 and 106 to relate the virtual volumes 1801 and 1802 to the global volume 1805 and the switch volumes 1803 and 1804. The storage virtualization programs 406 in the storage apparatuses 105 and 106 relate the virtual volumes 1801 and 1802 to the global volume 1805 and the switch volumes 1803 and 1804 in the management information. The steps S101 to S105 enable the host computer 101 to access data in the source virtual volume 1801 during the data migration.

Next, the migration management program 1213 starts migration of data in the volume 1801 (S106). The data migration performs data migration between the storage apparatuses 105 and 106 and data migration between tiers in the destination storage apparatus 106. Details of step S106 will be described later.

Upon completion of (data replication in) data migration of the data in the virtual volume 1801 between the storage apparatuses 105 and 106, the migration management program 1213 receives a notice of completion from the storage apparatus 105 or 106 to detect the completion of migration of the volume data (S107).

Upon completion of the data migration, the migration management program 1213 deletes the global volume 1805 and the switch volumes 1803 and 1804 created for the data migration (S108). The migration management program 1213 deletes information on these volumes from the management information for the data migration. The migration management program 1213 instructs the storage apparatuses 105 and 106 to delete the global volume 1805 and the switch volumes 1803 and 1804. The storage virtualization programs 408 in the instructed storage apparatuses 105 and 106 delete them (from the management information).

Finally, the migration management program 1213 cuts off the path between the source storage apparatus 105 and the host computer 101. Through this operation, the path from the host computer 101 to the volume to migrate is switched from the storage apparatus 105 to the storage apparatus 106. Thereafter, the host computer 101 accesses the virtual volume 1802 in the storage apparatus 106.

Figure 20:
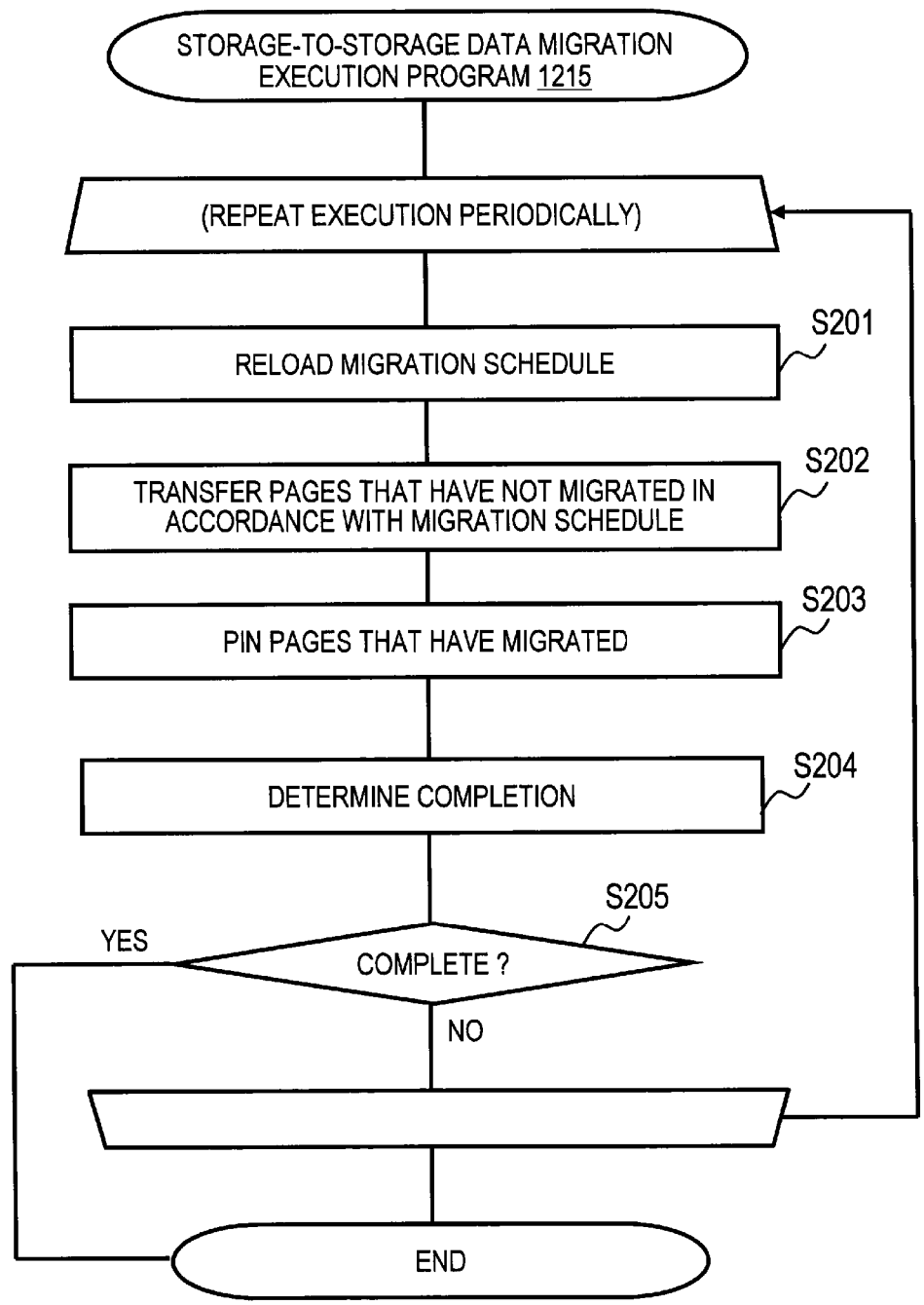
FIG. 20 is a flowchart illustrating exemplary processing of a storage-to-storage data migration execution program at step S106 of FIG. 19 in Example 1.

FIG. 20 is a flowchart illustrating exemplary processing of the storage-to-storage data migration execution program 1215. The storage-to-storage data migration execution program 1215 executes data migration between the storage apparatuses 105 and 106. In the flowchart of FIG. 20, the storage-to-storage data migration execution program 1215 periodically repeats execution of steps S201 to S205.

At step S201, the storage-to-storage data migration execution program 1215 reloads the storage-to-storage migration schedule management table 1225 (refer to FIG. 15). During data migration between storage apparatuses, the tier configuration (pages included in individual tiers) in the source volume 1801 varies.

The migration schedule management program 1216 periodically acquires information on the tier configuration from the source storage apparatus 105 during the data migration, and updates the storage-to-storage migration schedule management table 1225 during the data migration in accordance with the changes in the tier configuration of the source virtual volume 1801 in the course of the data migration. Specifically, it updates the values in the destination storage tier column 1505. This example does not change values in the other columns but the migration schedule management program 1216 may change the sequence of pages that have not migrated yet.

The update adds necessary changes to the storage-to-storage migration schedule management table 1225 in accordance with the variation in the tier configuration. Step S201 enables the storage-to-storage data migration execution program 1215 to perform page data migration suitable for the latest tier configuration of the source virtual volume 1801, achieving a smaller difference in the tier configuration between the destination virtual volume 1802 after the completion of the migration and the source virtual volume 1801.

Next, the storage-to-storage data migration execution program 1215 sequentially transfers data in the pages that have not migrated in accordance with the storage-to-storage migration schedule management table 1225 (S202). With reference to the migration completed column 1506, the storage-to-storage data migration execution program 1215 selects entries in descending order of the sequence (in order from the smallest value in the sequence column 1501) from the entries indicating the value "False" in their fields.

The storage-to-storage data migration execution program 1215 transfers data in the pages indicated by the page IDs in the page ID column 1502 of the selected entries to the storage tiers in the destination storage apparatus 106 indicated by the storage tier identifiers in the destination storage tier column 1505. Specifically, the storage-to-storage data migration execution program 1215 instructs the storage apparatus 106 to perform migration of page data of the selected entries. The data copy program 405 in the storage apparatus 106 executes copy of the data in the designated pages with the data copy program 405 in the storage apparatus 105.

Upon completion of the migration (copy) of page data and receipt of a notice of completion of the copy of the designated page data from the storage apparatus 106, the storage-to-storage data migration execution program 1215 updates the values in the migration completed column 1506 in the entries of the pages, from "False" into "True".

The storage-to-storage data migration execution program 1215 pins the pages in the destination storage apparatus 106 which have migrated (S203). Specifically, the storage-to-storage data migration execution program 1215 instructs the destination storage apparatus 106 to pin the data in the pages that have migrated.

In the destination storage apparatus 106, the tier control program 404 does not relocate data in the pinned pages depending on the accesses to the pages (the relocation is prohibited). This prevents the tier configuration (pages in each tier) in the destination virtual volume 1802 in the destination storage apparatus 106 from being changed depending on the accesses to the virtual volume 1802. This pinning can be omitted depending on the design.

As described above, the host computer 101 accesses the source virtual volume 1801 and does not access the destination virtual volume 1802 during data migration. For this reason, the pinning can prevent the tier control program 404 in the destination storage apparatus 106 from relocating page data in accordance with the not-existing accesses to the destination virtual volume 1802.

With reference to the storage-to-storage migration schedule management table 1225, the storage-to-storage data migration execution program 1215 determines whether data migration for all pages in the virtual volume 1801 has been completed (S204). If the data migration of the virtual volume 1801 has been completed (YES at S205), the storage-to-storage data migration execution program 1215 exits this flow. If any page that has not migrated remains (NO at S205), the storage-to-storage data migration execution program 1215 returns to step S201.

Figure 21:
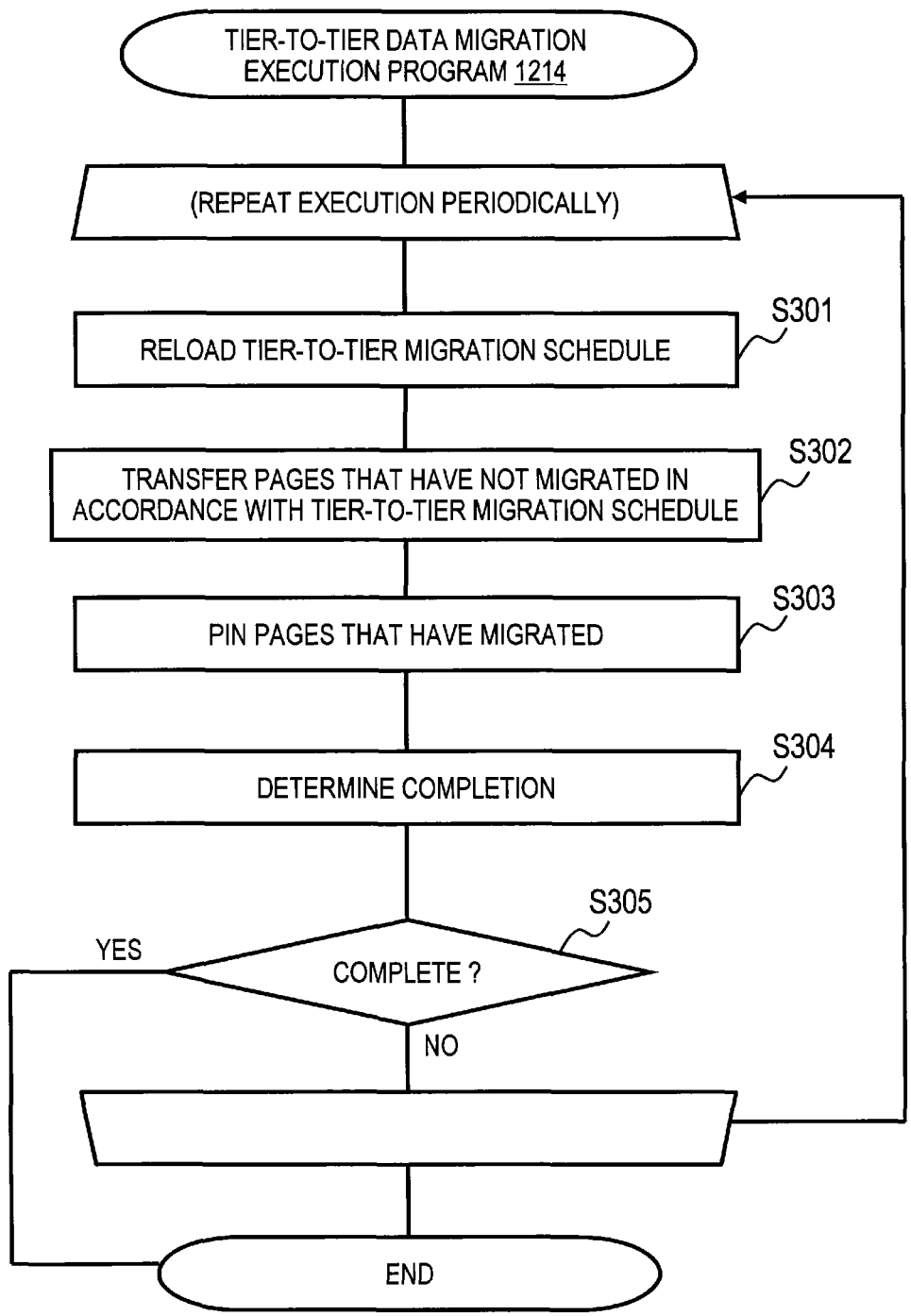
FIG. 21 is a flowchart illustrating exemplary processing of a tier-to-tier data migration execution program at step S106 of FIG. 19 in Example 1.

FIG. 21 is a flowchart illustrating exemplary processing of the tier-to-tier data migration execution program 1214 at step S106. In this example, the tier-to-tier data migration execution program 1214 performs data relocation between tiers in the destination virtual volume 1802 in the destination storage apparatus 106 during the storage-to-storage data migration. The data relocation between tiers is based on variation in the tier configuration of the source virtual volume. This operation reduces the difference in tier configuration between the source virtual volume and the destination virtual volume at switching accesses of the host computer 101.

In the flowchart of FIG. 21, the tier-to-tier data migration execution program 1214 periodically repeats execution of steps S301 to S305. At step S301, the tier-to-tier data migration execution program 1214 reloads the tier-to-tier migration schedule management table 1222 (refer to FIG. 16).

As described above, the tier configuration (pages included in the individual tiers) in the source volume 1801 varies in the course of data migration between storage apparatuses. During the data migration, the migration schedule management program 1216 periodically acquires information on the tier configuration of the virtual volume 1801 from the source storage apparatus 105.

During the data migration, the migration schedule management program 1216 updates the tier-to-tier migration schedule management table 1222 in accordance with the changes in the tier configuration of the source virtual volume 1801 in the course of the data migration. Specifically, the migration schedule management program 1216 adds and deletes entries. The migration schedule management program 1216 may change the values of the destination storage tier column 1604 or the sequence column 1601.

The update adds necessary changes to the tier-to-tier migration schedule management table 1222 in accordance with the variation in the tier configuration of the source virtual volume 1801. Step S301 enables the tier-to-tier data migration execution program 1214 to perform page data migration suitable for the latest tier configuration of the source virtual volume 1801, achieving a smaller difference in the tier configuration between the destination virtual volume 1802 after the completion of the migration and the source virtual volume 1801.

Next, the tier-to-tier data migration execution program 1214 sequentially transfers data in the pages that have not migrated in accordance with the tier-to-tier migration schedule management table 1222 (S302). With reference to the migration completed column 1605, the tier-to-tier data migration execution program 1214 selects entries in descending order of the sequence (in order from the smallest value in the sequence column 1601) from the entries indicating the value "False" in their fields.

The tier-to-tier data migration execution program 1214 transfers data in the pages indicated by the page IDs in the page ID column 1602 of the selected entries to the storage tiers indicated by the storage tier identifiers in the destination storage tier column 1604. The tier-to-tier data migration execution program 1214 performs relocation of page data to different tiers regardless of the pinned states of the pages. Upon completion of page data migration between tiers, the tier-to-tier data migration execution program 1214 updates the values in the migration completed column 1605 in the entries of the pages from "False" into "True".

The tier-to-tier data migration execution program 1214 pins the pages that have migrated in the destination storage tier (S303). The storage apparatus 106 has a table holding information on pinned states of individual pages (not shown). The pinning of migration data is the same as in data migration between storage apparatuses.

The tier-to-tier data migration execution program 1214 determines whether migration of data of all pages between storage apparatuses has been completed (S304). For example, the tier-to-tier data migration execution program 1214 can make determination depending on whether a notice of completion has been issued from the storage-to-storage data migration execution program 1215. If data migration between storage apparatuses has been completed (YES at S305), the tier-to-tier data migration execution program 1214 exits this flow. If any page that has not migrated yet remains (NO at S305), the tier-to-tier data migration execution program 1214 returns to step S301.

Figure 22A:
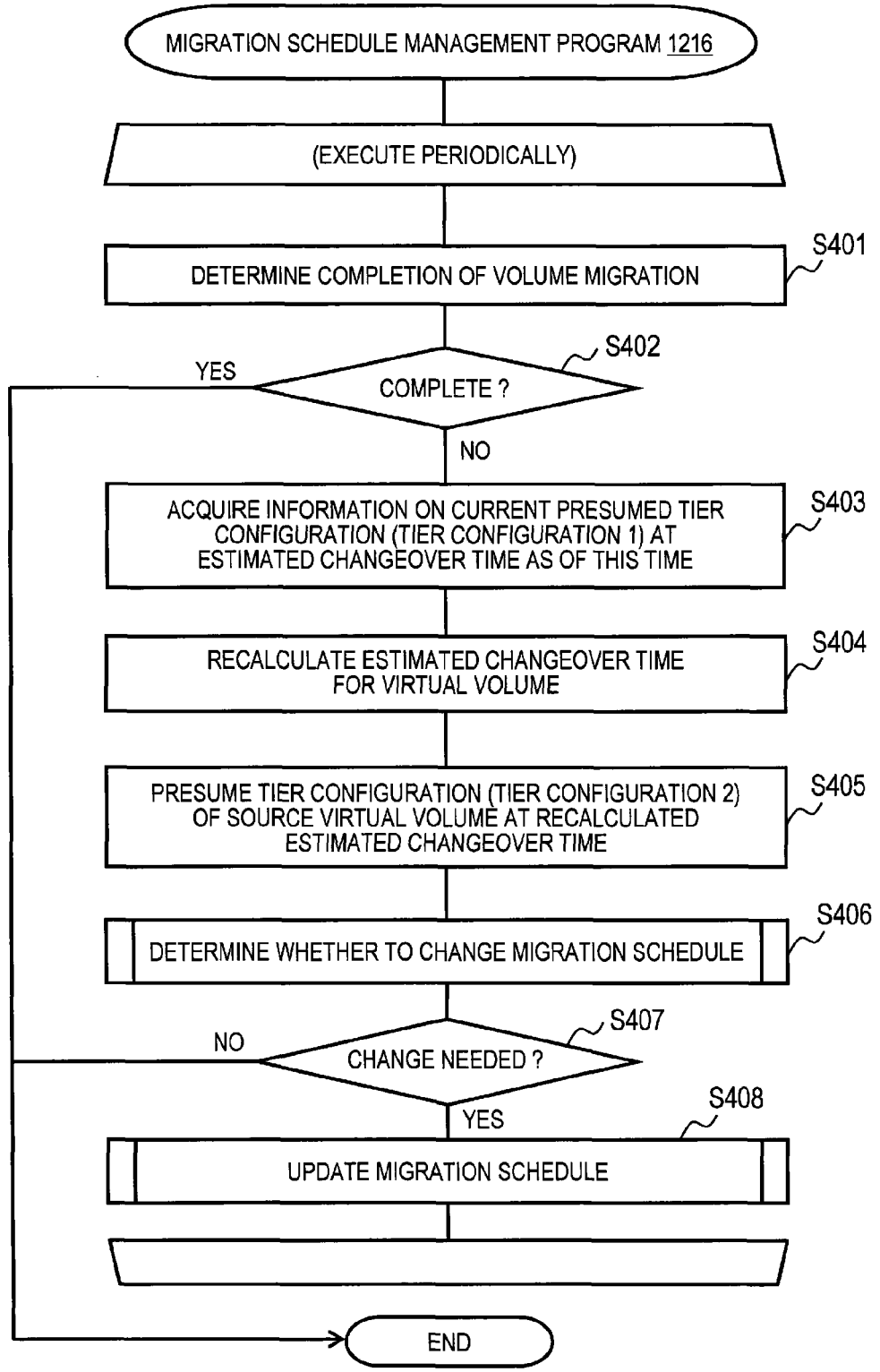
FIG. 22A is a flowchart illustrating exemplary determining and updating a migration schedule by a migration schedule management program in Example 1.
Figure 22B:
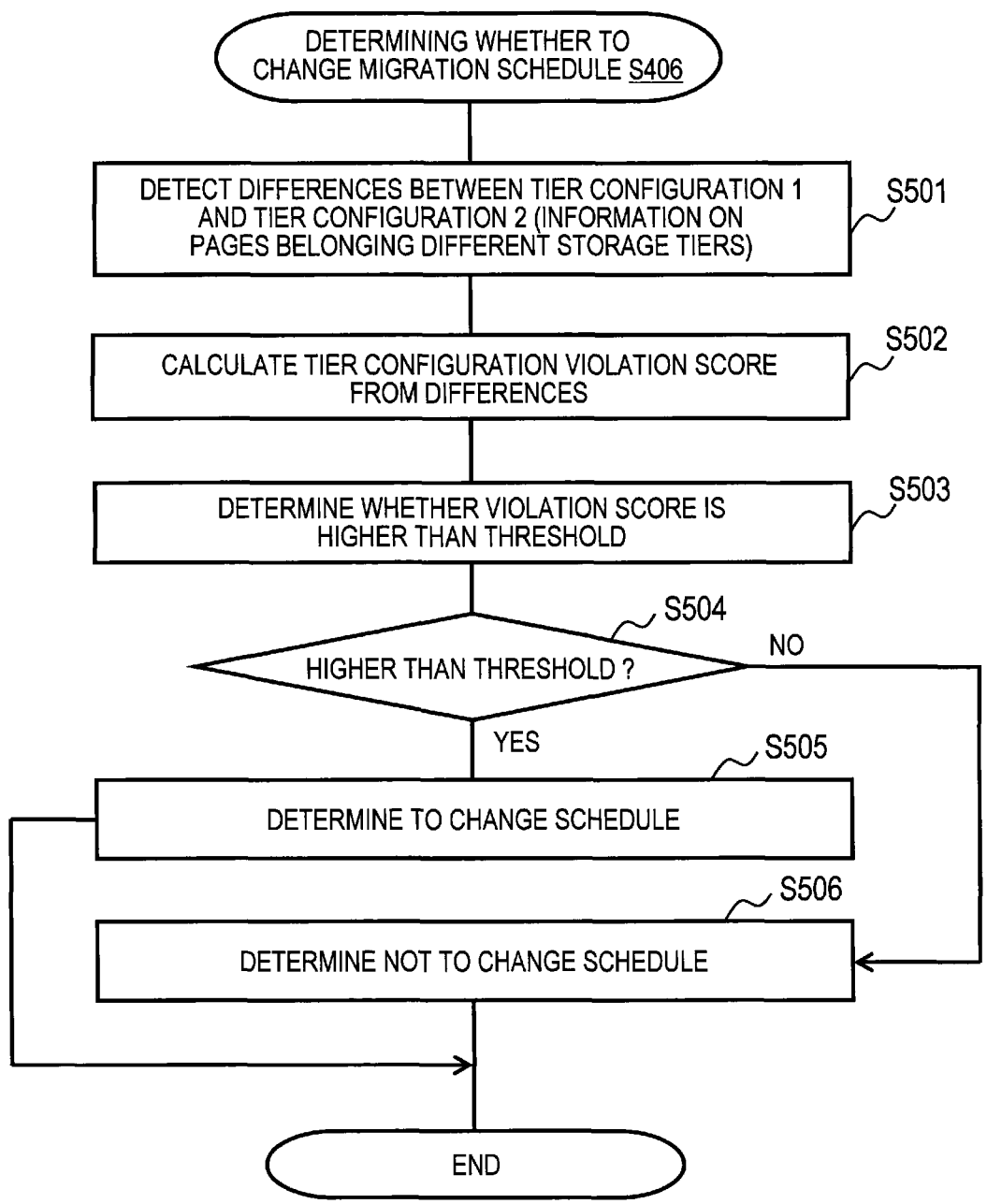
FIG. 22B is a flowchart illustrating exemplary determining and updating a migration schedule by a migration schedule management program in Example 1.
Figure 22C:
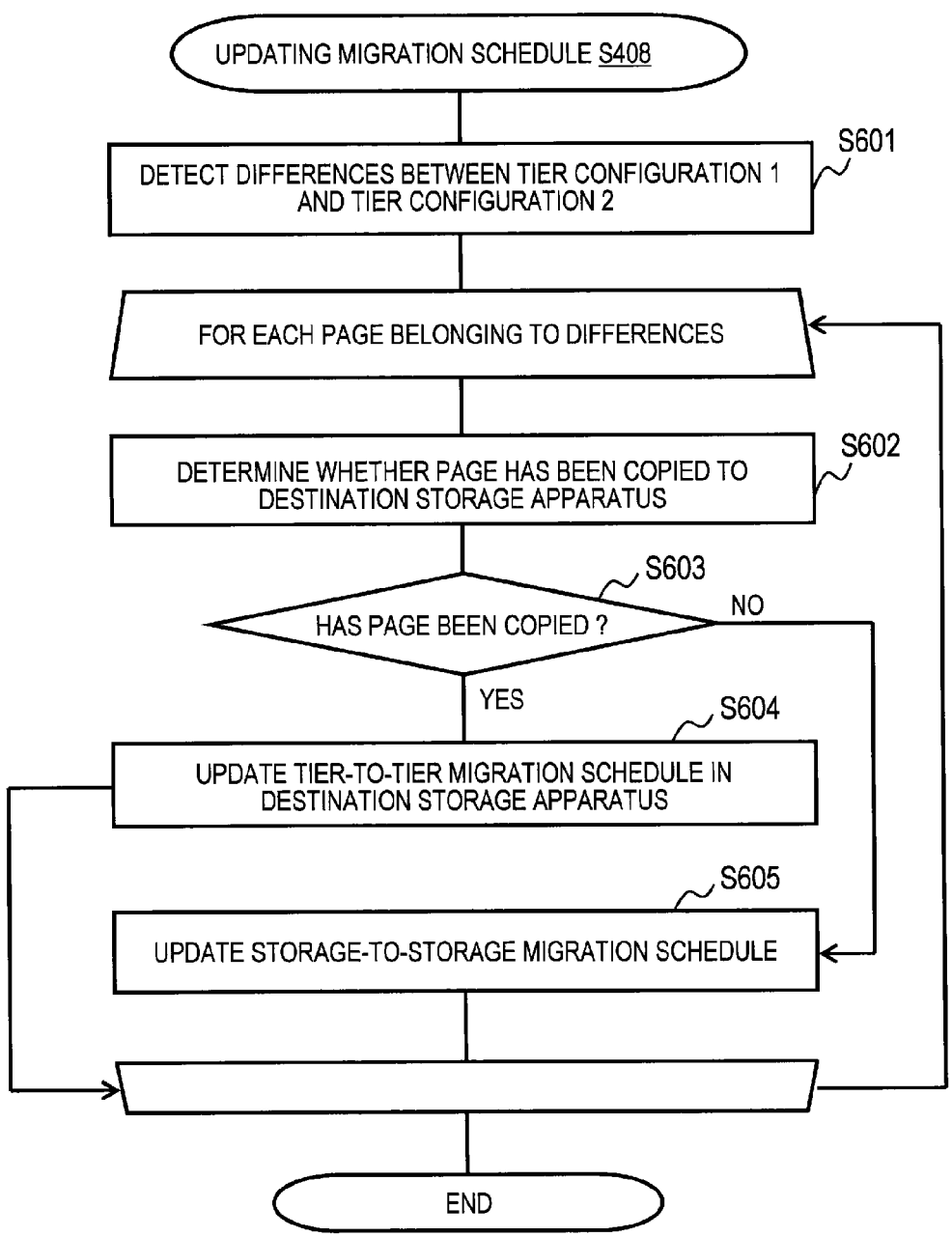
FIG. 22C is a flowchart illustrating exemplary determining and updating a migration schedule by a migration schedule management program in Example 1.

FIGS. 22A to 22C are flowcharts illustrating exemplary determining and updating a migration schedule by the migration schedule management program 1216. The migration schedule management program 1216 determines and updates both of the schedule of data migration between storage apparatuses and the schedule of data migration between storage tiers in the destination storage apparatus.

As described above, the schedule of data migration between storage apparatuses is managed by the storage-to-storage migration schedule management table 1225 and the schedule of data migration between storage tiers in the destination storage apparatus is managed by the tier-to-tier migration schedule management table 1222.

In FIG. 22A, the migration schedule management program 1216 periodically executes steps S401 to S408. At step S401, the migration schedule management program 1216 determines whether migration (copy) of a virtual volume 1801 has been completed. If all data in the virtual volume 1801 has been copied to a virtual volume 1802 (YES at S402), the migration schedule management program 1216 exits this flow.

If at least part of the data in the virtual volume 1801 has not migrated yet (NO at S402), the migration schedule management program 1216 proceeds to step S403. At step S403, the migration schedule management program 1216 acquires information on a current presumed tier configuration (tier configuration 1) at the estimated changeover time as of this time. The current storage-to-storage migration schedule management table 1225 and tier-to-tier migration schedule management table 1222 are based on the current presumed tier configuration (tier configuration 1).

The changeover time is the time for the host computer 101 to switch the access virtual volume from the source virtual volume 1801 to the destination virtual volume 1802 (refer to step S109 in FIG. 19) and is the time when migration of all data in the virtual volume 1801 has finished and the host computer 101 starts accessing the destination virtual volume 1802.

Furthermore, the migration schedule management program 1216 recalculates the estimated changeover time (S404). For example, the migration schedule management program 1216 can estimate the changeover time (completion time of storage-to-storage data migration) from a length from the start time of data migration between storage apparatuses 105 and 106 until the present time, an amount of data that has already migrated, and the total amount of data in the virtual volume 1801 to migrate. The migration schedule management program 1216 may consider the traffic in the communication path in estimating the changeover time.

The migration schedule management program 1216 presumes the tier configuration (tier configuration 2) of the source virtual volume 1801 at the estimated changeover time (S405). The tier configuration indicates which storage tiers individual pages are included in. The migration schedule management program 1216 can presume the tier configuration (tier configuration 2) of the source virtual volume 1801 at the estimated changeover time from the I/O history information of the virtual volume 1801. A method of presuming the tier configuration (tier configuration 2) of the source virtual volume 1801 at the estimated changeover time will be described later with reference to FIGS. 23A to 23C.

Next, the migration schedule management program 1216 determines whether to change the migration schedule (S406). At this step S406, the program 1216 determines whether to change the migration schedules for both of the migration between storage apparatuses (storage-to-storage migration schedule management table 1225) and the migration between tiers in the destination storage apparatus 106 (tier-to-tier migration schedule management table 1222). The method of this determination will be described later with reference to FIG. 22B.

If neither the storage-to-storage data migration schedule (storage-to-storage migration schedule management table 1225) nor the tier-to-tier data migration schedule (tier-to-tier migration schedule management table 1222) needs any change (NO at S407), the migration schedule management program 1216 exits this flow.

If the storage-to-storage data migration schedule (storage-to-storage migration schedule management table 1225) and/or the tier-to-tier data migration schedule (tier-to-tier migration schedule management table 1222) needs some change (YES at S407), the migration schedule management program 1216 changes and updates the storage-to-storage data migration schedule and/or the tier-to-tier data migration schedule that require the change (S408). Details of this step S408 will be described later with reference to FIG. 22C.

FIG. 22B is a flowchart illustrating exemplary determination whether to change the migration schedule (S406). The migration schedule management program 1216 detects differences between the presumed tier configuration (tier configuration 1) obtained at step S403 in FIG. 22A, which is a basis of the current schedule, and the tier configuration (tier configuration 2) newly presumed at S406 (S501). The differences between the storage tier configurations are portions differing in storage tiers individual pages belong to and are indicated by information on pages that belong to different storage tiers in the two storage tier configurations.

The migration schedule management program 1216 calculates a tier configuration violation score from the detected differences (S502). A greater violation score indicates that a bigger difference exists between the current presumed tier configuration (tier configuration 1) and the newly presumed tier configuration (tier configuration 2). A method of calculating the violation score will be described later.

The migration schedule management program 1216 compares the calculated violation score and a threshold (S503). If the violation score is equal to or lower than the predetermined threshold (NO at S504), the migration schedule management program 1216 determines not to change the migration schedule (S506).

If the violation score is higher than the predetermined threshold (YES at S504), the migration schedule management program 1216 determines to change the migration schedule (S505). In this example, the program 1216 determines to change both of the storage-to-storage data migration schedule (storage-to-storage data migration schedule management table 1225) and the tier-to-tier data migration schedule (tier-to-tier data migration schedule management table 1222).

In this way, the program 1216 changes the migration schedule in the case where the difference between the newly presumed tier configuration and the current presumed tier configuration is bigger than the threshold. That is to say, the program 1216 does not change the migration schedule in the case where the difference is small, eliminating increase in load caused by such less effective change of the schedule.

The difference between the current presumed tier configuration and the newly presumed tier configuration represented by an exemplary violation score indicates difference in performance between them. As the violation score is greater, the difference in performance is bigger and performance requirements are less satisfied by the performance capability achieved by the current presumed tier configuration. For example, the migration schedule management program 1216 calculates IOPS of each page and a response time (response performance) of the storage device including the storage tier the page belonging to for each of the tier configuration 1 and the tier configuration 2 and obtains their respective sums. The migration schedule management program 1216 uses the difference between the two sums as a violation score.

Another exemplary method of calculating a violation score is comparing the storage tiers of individual pages between the tier configuration 1 and the tier configuration 2 and counts pages of which the storage tier in the tier configuration 1 is a lower class than the storage tier in the tier configuration 2. The migration schedule management program 1216 uses this count value as violation score. The migration schedule management program 1216 may add weights in IOPS to the pages in this counting.

This example makes determinations for both of the storage-to-storage data migration schedule and the tier-to-tier data migration schedule under the same criteria. The migration schedule management program 1216 may apply different criteria to them. For example, it compares the violation score with different thresholds applied to the two schedules. Such comparison enables more appropriate determination of update for the respective kinds of data migration.

FIG. 22C is a flowchart illustrating exemplary updating a migration schedule (S408). The migration schedule management program 1216 detects differences between the current presumed tier configuration (tier configuration 1) obtained at step S403 in FIG. 22A and the tier configuration (tier configuration 2) newly presumed at step S406 (S601).

The migration schedule management program 1216 executes steps S602 to S605 for all pages belonging to the differences. The pages belonging to the differences are pages that belong to different tiers between the presumed tier configuration 1 and the presumed tier configuration 2.

The migration schedule management program 1216 determines whether the data in a selected page has been copied to the destination storage apparatus 106 (S603). The migration schedule management program 1216 can acquire this information from the storage-to-storage migration schedule management table 1225.

If the page data has been copied (migrated) to the destination storage apparatus 106 (YES at S604), the migration schedule management program 1216 changes the tier-to-tier migration schedule for this page. Specifically, the migration schedule management program 1216 changes the value in the destination storage tier column 1604 in the entry of the page data in the tier-to-tier migration schedule management table 1222 to the newly presumed storage tier, and further, if the value in the migration completed column 1605 is "True", it changes the value into "False".

If the page data has not been copied (migrated) to the destination storage apparatus 106 (NO at S604), the migration schedule management program 1216 changes the storage-to-storage migration schedule for this page. Specifically, the migration schedule management program 1216 changes the value in the destination storage tier column 1505 in the entry of the page data in the storage-to-storage migration schedule management table 1225 to the newly presumed storage tier.

Figure 23A:
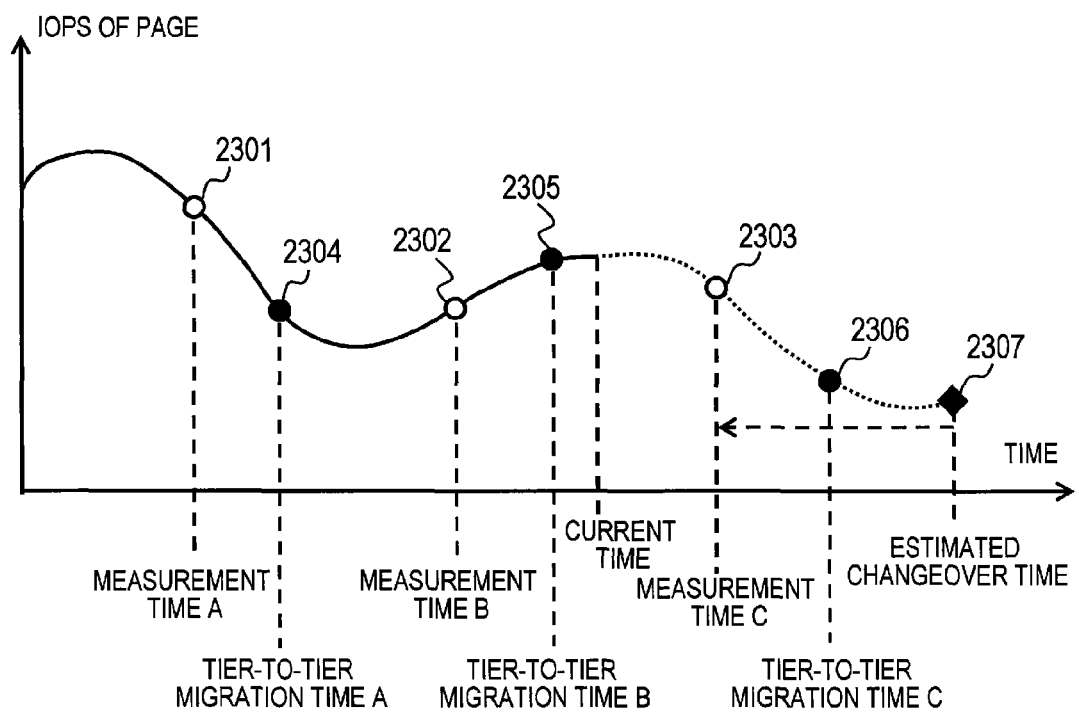
FIG. 23A is a drawing to illustrate an exemplary method of presuming a tier configuration in Example 1.
Figure 23B:
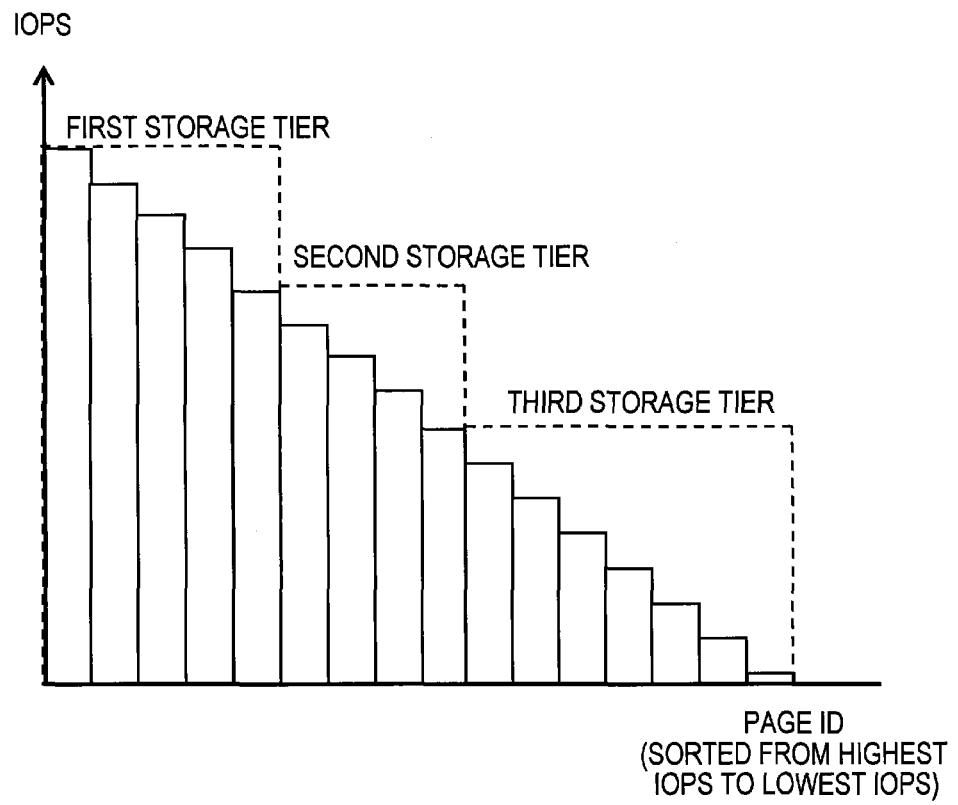
FIG. 23B is a drawing to illustrate an exemplary method of presuming a tier configuration in Example 1.

FIGS. 23A to 23C are drawings to illustrate an exemplary method of presuming the tier configuration. FIG. 23A is a graph schematically illustrating variation in IOPS of one page over time. In this graph, the solid line denotes actual IOPS and the dotted line denotes estimated IOPS. White circles 2301 to 2303 denote IOPS values at measurement times in the monitoring; black circles 2304 to 2306 denote IOPS values at tier-to-tier migration times. A diamond 2307 denotes an IOPS value at an estimated changeover time. The IOPS values at the white circle 2303, the black circle 2306, and the diamond 2307 are estimated values.

The I/O monitoring program 408 in the storage apparatus 105 updates the I/O monitoring management table 416 at each measurement time. The tier control program 404 determines the storage tier the page data should belong to at each tier-to-tier migration time based on the IOPS at the latest measurement time and performs necessary data relocation. The number of I/Os in a monitoring period represents IOPS.

The storage apparatus 105 repeats updating information on I/Os of each page at the measurement time and relocating data between tiers. For example, the tier control program 404 determines the storage tier to which page data should belong at the tier-to-tier migration times A and B based on the I/O information updated at the measurement times A and B, respectively, and performs necessary data relocation.

The migration schedule management program 1216 estimates the IOPS from the current time until the estimated changeover time from the previous I/O history of the page. The migration schedule management program 1216 can acquire information on the previous I/O history of each page from the I/O statistics information table 1224. The migration schedule management program 1216 can acquire information on the measurement times and the tier-to-tier migration times from the management information input/output program 407 in the storage apparatus 105. This information may be stored in the management computer 102 beforehand.

In an example, the migration schedule management program 1216 estimates future IOPS using moving average. Specifically, the migration schedule management program 1216 estimates the moving average of IOPS in a predetermined period back from a given time as a value of IOPS at the given time.

The calculating an estimated value of IOPS uses estimated values of IOPS prior to the particular given time. This calculation enables calculation of an estimated value of IOPS at a selected time between the current time and the estimated changeover time. The migration schedule management program 1216 can obtain approximate values of the IOPS between measurement times using an approximation function. The calculating a moving average of IOPS can use these approximated values.

The migration schedule management program 1216 can estimate variation in IOPS from the current time to the estimated changeover time by a calculation method different from the method using moving average. For example, the migration schedule management program 1216 may use an exponential smoothing method, a regression analysis method, a free style method, an intermittent estimation method, or the like. It may use a nearest neighbor method that refers to history records showing the closest tendency. These estimation methods are known techniques and this description omits detailed explanation on them.

The tier configuration of the source virtual volume 1801 at the estimated changeover time is the result of the latest tier-to-tier relocation. In the example of FIG. 23A, the result of the relocation at the tier-to-tier migration time C is the tier configuration of the source virtual volume 1801 at the estimated changeover time. The relocation at the tier-to-tier migration time C is based on the I/O information at the latest measurement time C.

The migration schedule management program 1216 determines the latest tier-to-tier migration time C before the estimated changeover time and further determines the latest measurement time C before that. The migration schedule management program 1216 calculates an estimated value of IOPS 2303 at the measurement time C. The migration schedule management program 1216 calculates an estimated value of IOPS at the monitoring time C for every page in the source virtual volume 1801.

FIG. 23B is a graph schematically illustrating the relationship between IOPS of all pages in the source virtual volume 1801 and storage tiers they belong to. The y-axis represents IOPS and the x-axis represents page IDs. Values of page IDs are sorted in order from the highest IOPS. That is to say, the values of page IDs are sorted in the order of IOPS along the x-axis.

In this example, the tier control program 404 refers to the I/O information at the latest measurement time to determine the storage tier each page should belong to based on the IOPS of the page (the number of I/Os in the monitoring period). This example allocates pages to the storage tiers, in descending order of IOPS such that the page with the highest IOPS will be allocated to the highest-class tier first.

Specifically, the tier control program 404 allocates a specified number of pages among the pages of which the IOPS is higher than the other pages to the highest-class storage tier (storage tier 1). The tier control program 404 allocates a specified number of pages among the remaining pages of which the IOPS is higher than the other pages to the next-class storage tier (storage tier 2). The tier control program 404 allocates the remaining pages to the lowest-class storage tier (storage tier 3).

The migration schedule management program 1216 presumes the tier configuration of the source virtual volume 1801 at the estimated changeover time in accordance with the tier determination method by the tier control program 404. The tier control program 404 can determine the storage tier a page should belong to by a method different from the above-described method.

FIG. 23C is a table 2500 indicating an exemplary tier configuration presumed by the tier configuration determination method in FIG. 23B. The table 2500 includes columns of times 2501, page IDs 2502, and storage tiers 2503. The time column 2501 stores estimated changeover times. In each entry, a page denoted by a value in the page ID column 2502 belongs to the storage tier denoted by a value in the storage tier column 2503.

This example determines the tier configuration of the destination volume based on the I/Os for the source volume during data migration to achieve a small difference in tier configuration between the source volume and the destination volume.

This example performs migration of data that has migrated to a destination volume, between storage tiers in the destination volume. This migration achieves a smaller difference in the tier configuration between the source volume and the destination volume at the changeover. Another exemplary configuration may omit this data relocation in the destination volume in the course of the data migration.

This example determines the destination storage tier in page data migration (copy) from the source volume to the destination volume based on I/Os. This determination achieves a smaller number of times of data relocation between tiers in the destination volume. Another exemplary configuration may omit this dynamic update of the destination storage tier based on I/Os in the data migration from a source volume to a destination volume.

This example determines the destination storage tier based on a presumed tier configuration of the source volume at changeover. This determination achieves a smaller difference in tier configuration between the source volume and the destination volume at changeover. Another exemplary configuration may determine the destination storage tier based on the current or a previous tier configuration of the source volume.

The method of data migration in this example is applicable to data migration between volumes in different pools in the same storage apparatus as well as data migration between volumes in different storage apparatuses.

EXAMPLE 2

Hereinafter, Example 2 will be described. Differences from Example 1 will be mainly explained. The foregoing Example 1 sequentially adjusts the configuration of the destination tier to meet the configuration at the changeover. Example 2 determines the destination storage tiers of pages (data arrangement) immediately before migration (copy) of page data from a storage apparatus to another and transfers the page data to the determined storage tiers.

This example determines a page data arrangement in the storage-to-storage migration in such a manner that the destination storage tier of page data will be the same as the source storage tier at the time of migration (current time). If the numbers of storage tiers are different between the source volume and the destination volume, the management computer 102 may relate the individual source storage tiers to any of the destination storage tiers beforehand and transfer page data to the related storage tiers. The source storage tier of a page is determined depending on the I/O history of the source volume during the data migration.

In this example, the host computer 101 accesses page data that has migrated to the destination storage apparatus 106 during volume data migration. In other words, the host computer 101 accesses the source storage apparatus 105 for the pages that have not migrated and accesses the destination storage apparatus for the pages that have migrated. For this reason, this example does not pin the page data that has migrated. The tier control program 404 in the destination storage apparatus 106 relocates page data in accordance with accesses from the host computer 101 to the destination virtual volume 1802.

Figure 24:
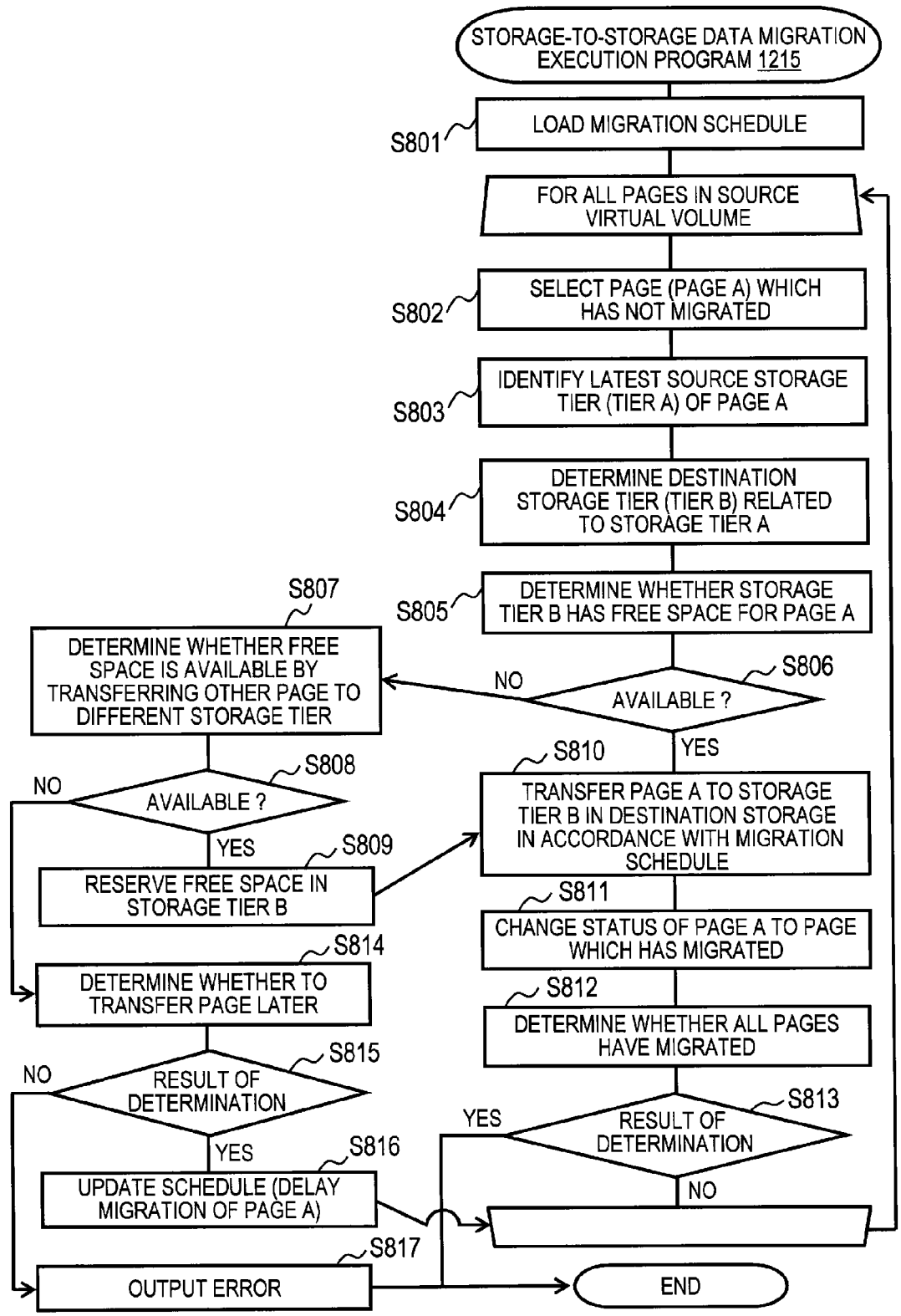
FIG. 24 is a flowchart illustrating an exemplary method of storage-to-storage data migration in Example 2.

The method of storage-to-storage data migration in this example will be described more specifically with reference to FIG. 24. The storage-to-storage data migration execution program 1215 loads the storage-to-storage migration schedule management table 1225 indicating the storage-to-storage migration schedule (S801). The migration schedule management program 1216 creates the storage-to-storage migration schedule management table 1225 and stores initial values, for example, the identifiers of the source storage tiers at the creation of the table, in the destination storage tier column 1505.

The storage-to-storage data migration execution program 1215 executes steps S802 to S817 for all pages in the source virtual volume 1801. At step S802, the storage-to-storage data migration execution program 1215 selects a page (page A) that has not migrated, that is, a page having the value "False" in the migration completed column 1506 in the storage-to-storage migration schedule management table 1225.

The storage-to-storage data migration execution program 1215 identifies the source storage tier (storage tier A) of the selected page A (S803). The storage-to-storage data execution program 1215 acquires information on the source storage tier (storage tier A) of the selected page A from the source storage apparatus 105 using the input/output management program 1211.

Next, the storage-to-storage migration execution program 1215 determines the destination storage tier (storage tier B) related to the storage tier A (S804). The storage tier B for the storage tier A is predetermined; for example, they are equivalent.

The storage-to-storage migration execution program 1215 determines whether the storage tier B has free space for the page A (S805). The storage-to-storage migration execution program 1215 acquires information on the free space in the storage tier B from the destination storage apparatus 106 using the input/output management program 1211 and makes the determination with the values. For example, if the size of the free space is larger than a predetermined threshold, the program 1215 determines that the storage tier B has free space for the page A.

If the storage tier B does not have free space for the page A (NO at S806), the storage-to-storage migration execution program 1215 determines whether free space will be available by transferring other page in the storage tier B to a different storage tier (S807).

It the result of this determination is positive (YES at S808), the storage-to-storage migration execution program 1215 instructs the storage apparatus 106 to reserve free space in the storage tier B by data migration (S809), and proceeds to step S810. If the result of the determination at step S805 is positive (YES at S805), the storage-to-storage migration execution program 1215 proceeds to step S810, too.

The storage-to-storage migration execution program 1215 transfers the page A to the storage tier B in the destination storage apparatus in accordance with the migration schedule (S810). The storage-to-storage migration execution program 1215 changes the status of page A to a page that has migrated in the storage-to-storage migration schedule management table 1225. Specifically, it changes the value of the migration completed column 1506 in the entry of page A, from "False" into "True".

The storage-to-storage migration execution program 1215 determines whether all pages have migrated with reference to the storage-to-storage migration schedule management table 1225 (S812). If all pages have migrated (YES at S813), the program 1215 exits this flow. If any pages has not migrated yet (NO at S813), the program 1215 returns to step S802.

If the result of the determination at step S807 is negative (NO at S808), the storage-to-storage migration execution program 1215 determines whether to transfer the data in the page A later (S814). If the result of this determination is negative (NO at S815), the storage-to-storage migration execution program 1215 outputs an error to the input/output device 1204 (S817). For example, if the size of the free space in the destination storage tier B is smaller than a predetermined threshold, the result of the determination is negative; if it is equal to or larger than the threshold, the result of the determination is positive.

If the result of the determination is positive (YES at S815), the storage-to-storage migration execution program 1215 updates the storage-to-storage migration schedule management table 1225 to delay the migration of the page A (S816) and returns to step S802.

The method of data migration in this example may be applied to a configuration where the host computer 101 accesses only the source volume during data migration, like the method of Example 1. The storage-to-storage migration execution program 1215 may determine a lower-class storage tier for the destination storage tier, instead of outputting an error. The foregoing example provisionally determines the destination tier in the storage-to-storage migration schedule management table 1225 prior to the start of migration, but may omit the provisional determination of the destination storage tier.

As set forth above, embodiments of this invention have been explained, but this invention is not limited to the foregoing embodiments. Those skilled in the art can easily change, add, or convert the elements in the embodiments within the scope of this invention. A part of the configuration of one embodiment may be replaced with that of a different embodiment; the configuration of an embodiment can be incorporated to another embodiment. A part of the configuration of each embodiment may be added to, deleted from, and replaced by that of a different configuration.

As described above, the information storage system of the embodiments includes one or more storage apparatuses and management computers. Part of the processing of the management computer may be performed by the storage apparatus. In such a configuration, the management system of the information storage system includes the management computer and the relevant functions of the storage apparatus.

In the above description, the tier control program 404 performs tier control by the page. Alternatively, another example may perform tier control by the volume. It determines the storage tier for a volume to belong to by the IOPS (I/O counts during the monitoring period) of the volume indicated in the I/O information obtained at the latest measurement time in the monitoring.

The invention claimed is:

1. A method of data migration from a source volume including storage areas of a plurality of source storage tiers different in performance capability to a destination volume including storage areas of a plurality of destination storage tiers different in performance capability, data relocation being performed among the plurality of source storage tiers in accordance with accesses to the source volume during the data migration, the method comprising:
   starting the data migration between volumes from the source volume to the destination volume;
   acquiring information on a data arrangement in the source volume determined based on an access history to the source volume during the data migration between volumes from the source volume to the destination volume;
   determining a data arrangement in the destination volume during the data migration between volumes based on the data arrangement indicated by the acquired information;
   creating a schedule of the data migration between volumes from the source volume to the destination volume before starting the data migration between volumes from the source volume to the destination volume, the schedule indicating destination storage tiers of data which is in the source volume and has not migrated to the destination volume;
   performing the data migration between volumes from the source volume to the destination volume in accordance with the schedule; and
   updating the destination storage tiers in the schedule based on the acquired information.

2. A method according to claim 1, further comprising:
   creating a schedule of the data migration among the destination storage tiers in the destination volume, the data migration schedule indicating destination storage tiers of data which has migrated from the source volume to the destination volume;
   performing the data migration among the destination storage tiers in the destination volume in accordance with the data migration schedule; and
   updating the destination storage tiers in the data migration schedule based on the acquired information.

3. A method according to claim 1, further comprising:
   selecting a destination storage tier for the source volume from the plurality of destination storage tiers based on the data arrangement indicated by the acquired information; and
   selecting a destination storage tier in the destination volume for data which has migrated from the source volume to the destination volume from the plurality of destination storage tiers based on the data arrangement indicated by the acquired information.

4. A method according to claim 1, wherein the information on a data arrangement is a presumed data arrangement in the source volume at an estimated changeover time of accesses of a host from the source volume to the destination volume.

5. A method according to claim 4, wherein the schedule is changed in a case where a difference between a presumed data arrangement, which is a basis of a current configuration of the schedule, and a newly presumed data arrangement is larger than a threshold.

6. A method according to claim 1,
   wherein a host accesses the source volume during the data migration between volumes from the source volume to the destination volume; and
   wherein data in the destination volume that has migrated from the source volume is prohibited from being relocated based on accesses of the host to the destination volume during the data migration between volumes.

7. A method according to claim 1,
   wherein the storage areas of the source volume and the destination volume are divided into pages for management;
   wherein the information on a data arrangement in the source volume indicates a current data arrangement in the source volume;
   wherein a destination storage tier of data in a page in the data migration from the source volume to the destination volume is equivalent to a current source storage tier of a page indicated by the information.

8. A method according to claim 7,
   wherein a host accesses data in the source volume that has not migrated to the destination volume and data in the destination volume that has migrated from the source volume during the data migration from the source volume to the destination volume; and
   wherein data relocation among destination storage tiers is performed in the destination volume in accordance with accesses of the host to the destination volume.

9. An information storage system comprising a source storage apparatus, a destination storage apparatus, and a management system, the information storage system performing data migration between volumes from a source volume in the source storage apparatus to a destination volume in the destination storage apparatus,
   wherein the source storage apparatus includes storage areas of a plurality of source storage tiers different in performance capability and provides a host with the source volume in which data relocation is performed among the plurality of source storage tiers in accordance with accesses;
   wherein the destination storage apparatus includes storage areas of a plurality of destination storage tiers different in performance capability and provides a host with the destination volume in which data relocation is performed among the plurality of destination storage tiers in accordance with accesses after the data migration between volumes;
   wherein the management system starts the data migration between volumes from the source volume to the destination volume;
   wherein the management system acquires information on a data arrangement in the source volume determined based on an access history to the source volume during the data migration between volumes from the source volume to the destination volume;
   wherein the management system determines a data arrangement in the destination volume during the data migration between volumes based on the data arrangement indicated by the acquired information;
   wherein the management system creates a schedule for the data migration between volumes from the source volume to the destination volume before starting the data migration between volumes from the source volume to the destination volume, the schedule indicating destination storage tiers of data in the source volume which has not migrated to the destination volume;
   wherein the management system performs the data migration between volumes from the source volume to the destination volume in accordance with the schedule; and
   wherein the management system updates the destination storage tiers in the schedule based on the acquired information.

10. An information storage system according to claim 9, wherein the management system creates a data migration schedule between destination storage tiers in the destination volume, the data migration schedule indicating destination storage tiers for data that have migrated from the source volume to the destination volume;

wherein the management system performs data migration between destination storage tiers in the destination volume in accordance with the data migration schedule; and wherein the management system updates the destination storage tiers in the data migration schedule based on the acquired information.

11. An information storage system according to claim 9, wherein the information on a data arrangement indicates a presumed data arrangement of the source volume at an estimated changeover time of accesses of a host from the source volume to the destination volume.

12. An information storage system according to claim 9, wherein the source volume is accessed by a host during the data migration between volumes from the source volume to the destination volume; and wherein data in the destination volume that has migrated from the source volume is prohibited from being relocated based on accesses of the host to the destination volume during the data migration between volumes.

13. An information storage system according to claim 9, wherein storage areas of the source volume and the destination volume are divided into pages for management;

wherein the information on a data arrangement in the source volume indicates a current data arrangement in the source volume; and wherein a destination storage tier in migration of data in a page from the source volume to the destination volume is equivalent to a current source storage tier of a page indicated by the information.

* * * * *